US008549077B2

(12) United States Patent
Cohen et al.

(10) Patent No.: US 8,549,077 B2
(45) Date of Patent: Oct. 1, 2013

(54) USAGE PARAMETERS FOR COMMUNICATION CONTENT

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1526 days.

(21) Appl. No.: 11/545,094

(22) Filed: Oct. 5, 2006

(65) Prior Publication Data

US 2008/0005243 A1 Jan. 3, 2008

Related U.S. Application Data

(63) Continuation-in-part of application No. 11/480,773, filed on Jun. 30, 2006.

(51) Int. Cl.
*G06F 15/16* (2006.01)

(52) U.S. Cl.
USPC .......................................... 709/205; 709/204

(58) Field of Classification Search
USPC ................ 709/225, 229, 204, 205, 200–203, 709/228
See application file for complete search history.

(56) References Cited

U.S. PATENT DOCUMENTS

| | | | |
|---|---|---|---|
| 5,473,367 A * | 12/1995 | Bales et al. | 348/14.11 |
| 6,064,671 A * | 5/2000 | Killian | 370/389 |
| 6,192,396 B1 | 2/2001 | Kohler | |
| 6,240,414 B1 * | 5/2001 | Beizer et al. | 1/1 |
| 6,335,963 B1 | 1/2002 | Bosco | |
| 6,356,936 B1 | 3/2002 | Donoho et al. | |
| 6,658,568 B1 * | 12/2003 | Ginter et al. | 713/193 |
| 6,678,719 B1 | 1/2004 | Stimmel | |
| 6,731,308 B1 | 5/2004 | Tang et al. | |
| 6,896,263 B2 | 5/2005 | Matthews | |
| 6,912,564 B1 | 6/2005 | Appelman et al. | |
| 6,999,962 B2 * | 2/2006 | Julliard et al. | 1/1 |
| 7,039,597 B1 * | 5/2006 | Notani et al. | 705/9 |
| 7,143,175 B2 * | 11/2006 | Adams et al. | 709/229 |
| 7,299,257 B2 | 11/2007 | Boyer et al. | |
| 7,305,398 B2 | 12/2007 | Teicher | |
| 7,383,307 B2 | 6/2008 | Kirkland et al. | |
| 7,533,146 B1 * | 5/2009 | Kumar | 709/205 |
| 7,574,746 B2 * | 8/2009 | Hill et al. | 726/27 |
| 7,797,732 B2 * | 9/2010 | Tam et al. | 726/3 |
| 7,925,702 B2 * | 4/2011 | Rood et al. | 709/205 |
| 2002/0034164 A1 * | 3/2002 | Sjoholm et al. | 370/260 |
| 2002/0098879 A1 | 7/2002 | Rheey | |
| 2003/0182371 A1 * | 9/2003 | Worthen | 709/204 |

(Continued)

OTHER PUBLICATIONS

U.S. Appl. No. 11/525,198, Alexander J. Cohen et al.

(Continued)

*Primary Examiner* — Moustafa M Meky

(57) ABSTRACT

In one aspect, a method related to data management. In addition, other method, system, and program product aspects are described in the claims, drawings, and/or text forming a part of the present application.

46 Claims, 28 Drawing Sheets

(56) References Cited

U.S. PATENT DOCUMENTS

| | | |
|---|---|---|
| 2003/0236847 A1 | 12/2003 | Benowitz et al. |
| 2004/0039829 A1* | 2/2004 | Bucher .................... 709/229 |
| 2004/0088286 A1* | 5/2004 | Hackleman et al. ............. 707/3 |
| 2004/0103147 A1* | 5/2004 | Flesher et al. ............... 709/204 |
| 2004/0117194 A9* | 6/2004 | Lee et al. ........................ 705/1 |
| 2004/0254809 A1 | 12/2004 | Teicher |
| 2005/0089023 A1* | 4/2005 | Barkley et al. ............... 370/352 |
| 2005/0097169 A1* | 5/2005 | Mukherjee et al. .......... 709/204 |
| 2005/0108207 A1* | 5/2005 | Thuerk ............................. 707/3 |
| 2005/0149620 A1 | 7/2005 | Kirkland et al. |
| 2005/0181803 A1 | 8/2005 | Weaver et al. |
| 2006/0004869 A1 | 1/2006 | Yuster et al. |
| 2006/0227754 A1 | 10/2006 | Ko |
| 2006/0242303 A1* | 10/2006 | Petrack ......................... 709/227 |
| 2007/0021200 A1 | 1/2007 | Fox et al. |
| 2007/0036310 A1 | 2/2007 | Smith et al. |
| 2007/0121614 A1 | 5/2007 | Sandell et al. |
| 2007/0133774 A1* | 6/2007 | Fujimoto ................. 379/202.01 |
| 2007/0240081 A1 | 10/2007 | Grossman et al. |
| 2007/0263824 A1* | 11/2007 | Bangalore et al. ....... 379/202.01 |
| 2008/0005681 A1 | 1/2008 | Cohen et al. |
| 2008/0109860 A1 | 5/2008 | Glashow et al. |
| 2010/0322395 A1 | 12/2010 | Michaelis et al. |
| 2011/0145570 A1 | 6/2011 | Gressel et al. |

OTHER PUBLICATIONS

U.S. Appl. No. 11/506,415, Alexander J. Cohen et al.

Abramson, Andy; "VoIP Watch: Skype Goes With Warner Music For Ringtones and Maybe More"; AndyAbramson.blogs.com; bearing a date of Jan. 30, 2006; pp. 1-6; located at: http://andyabramson.blogs.com/voipwatch/2006/01/skype_goes_with.html; printed on Jun. 26, 2006.

"Warner Music Group Announces Landmark Ringtone Agreement With Skype, Global Internet Calling Company: Madonna Set to Be First Exclusive 'Featured Artist' on New Online Retail Store"; Market Wire News; bearing a date of Jan. 30, 2006; pp. 1-3; New York; located at: http://www.marketwire.com/mw/release_printer_friendly?release_id=107824&category=; printed on Jun. 26, 2006.

* cited by examiner

FIG. 1A

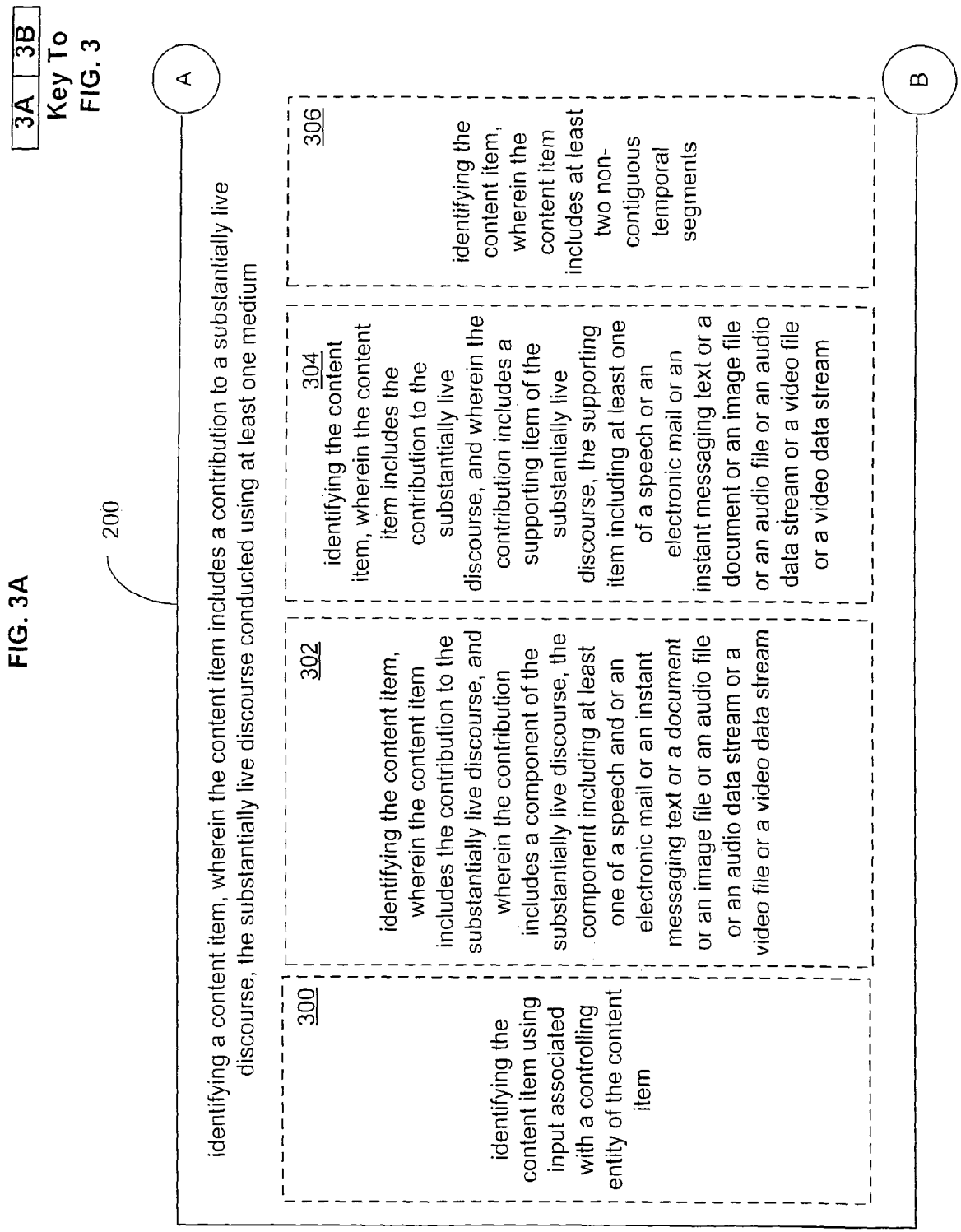

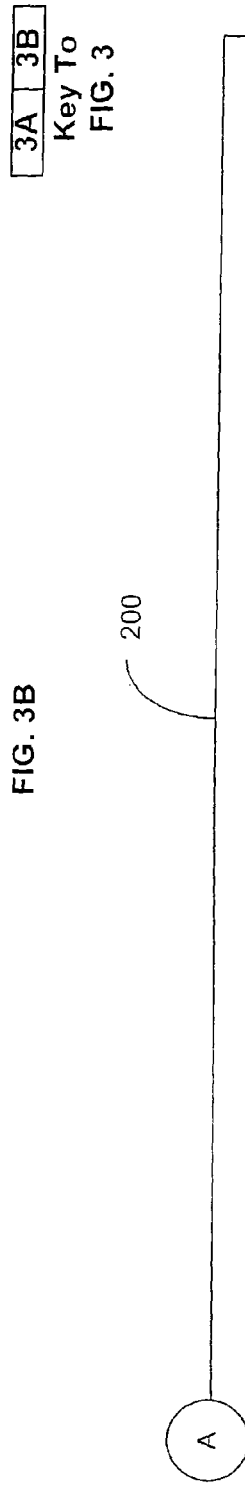

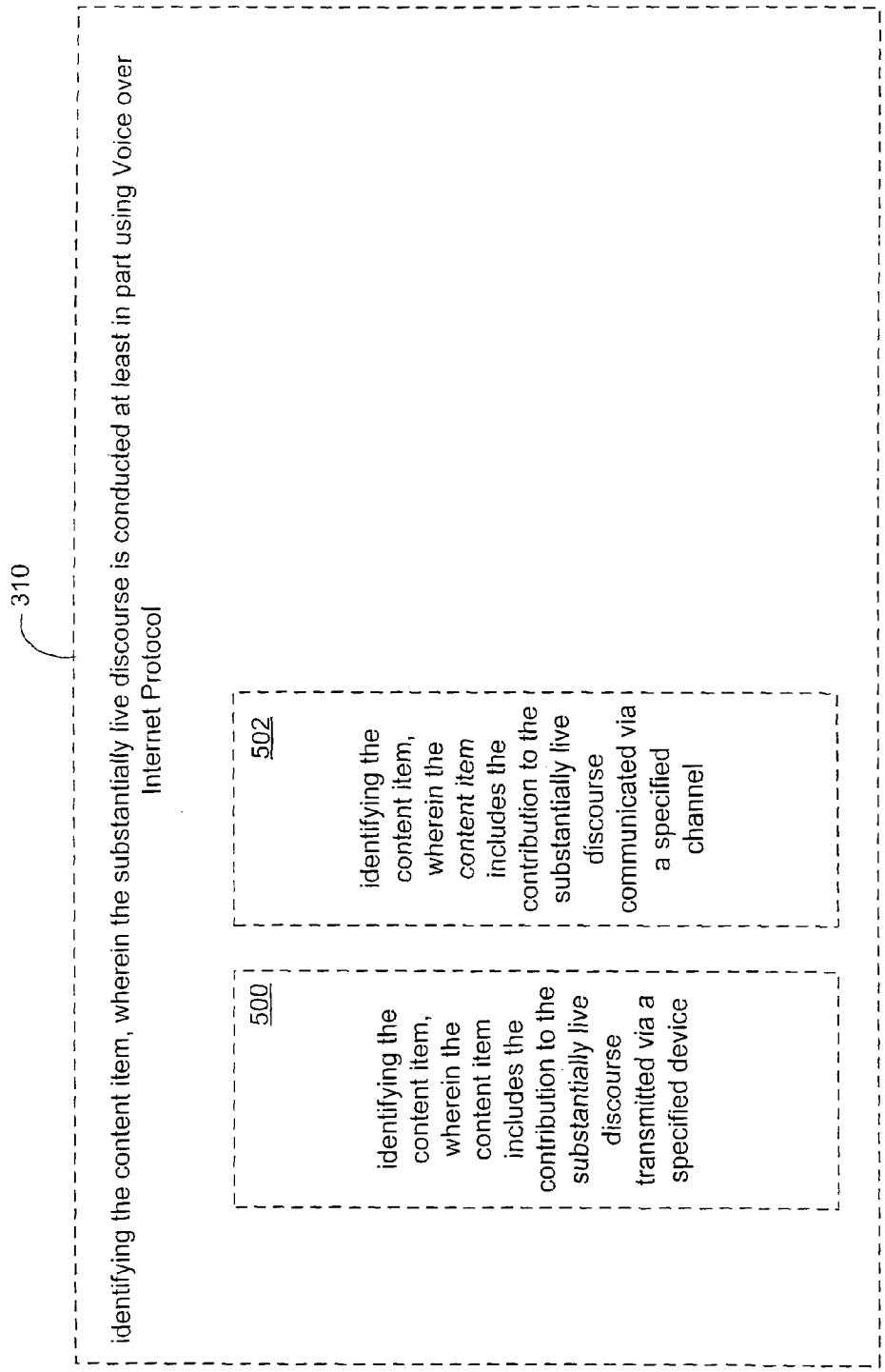

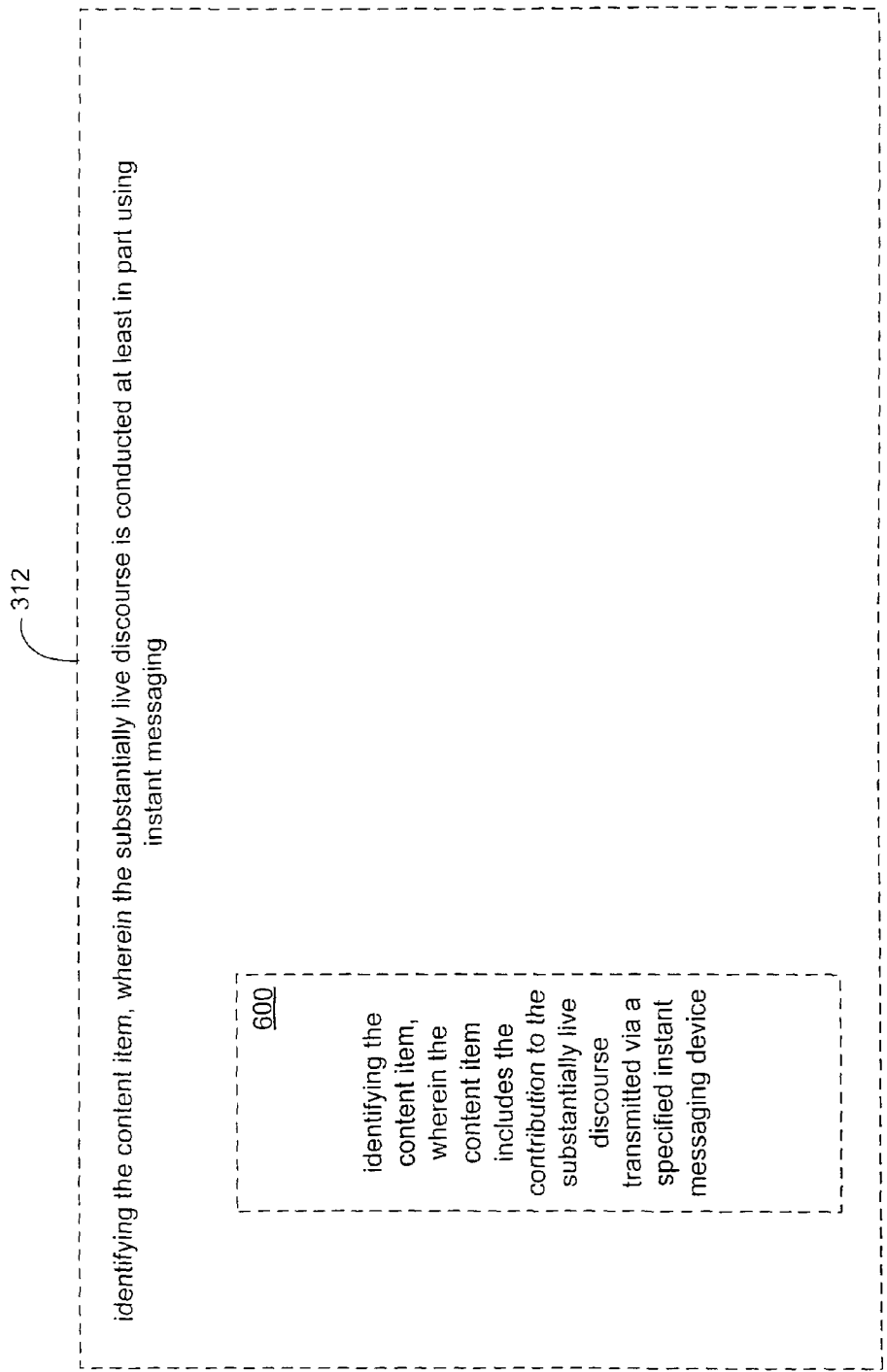

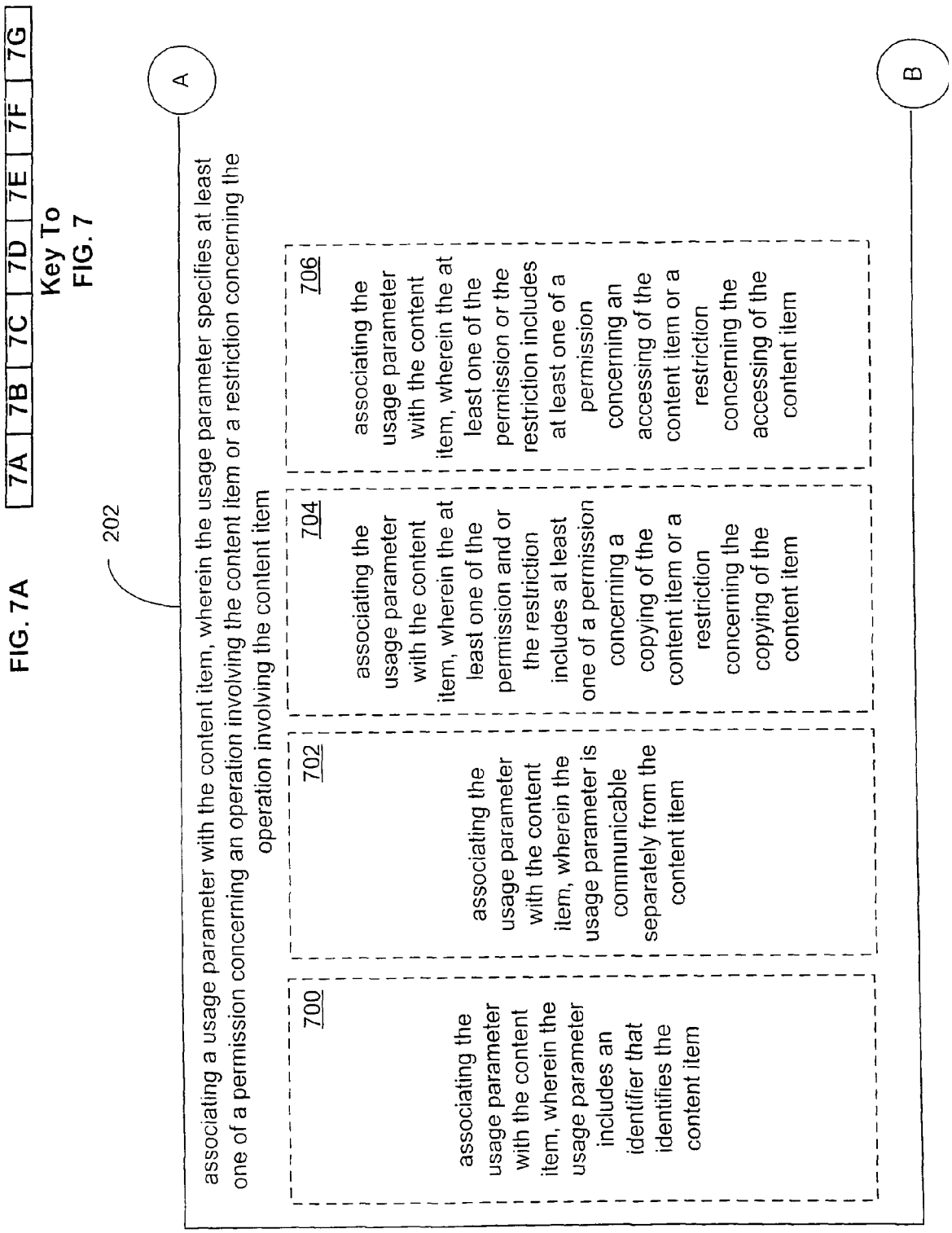

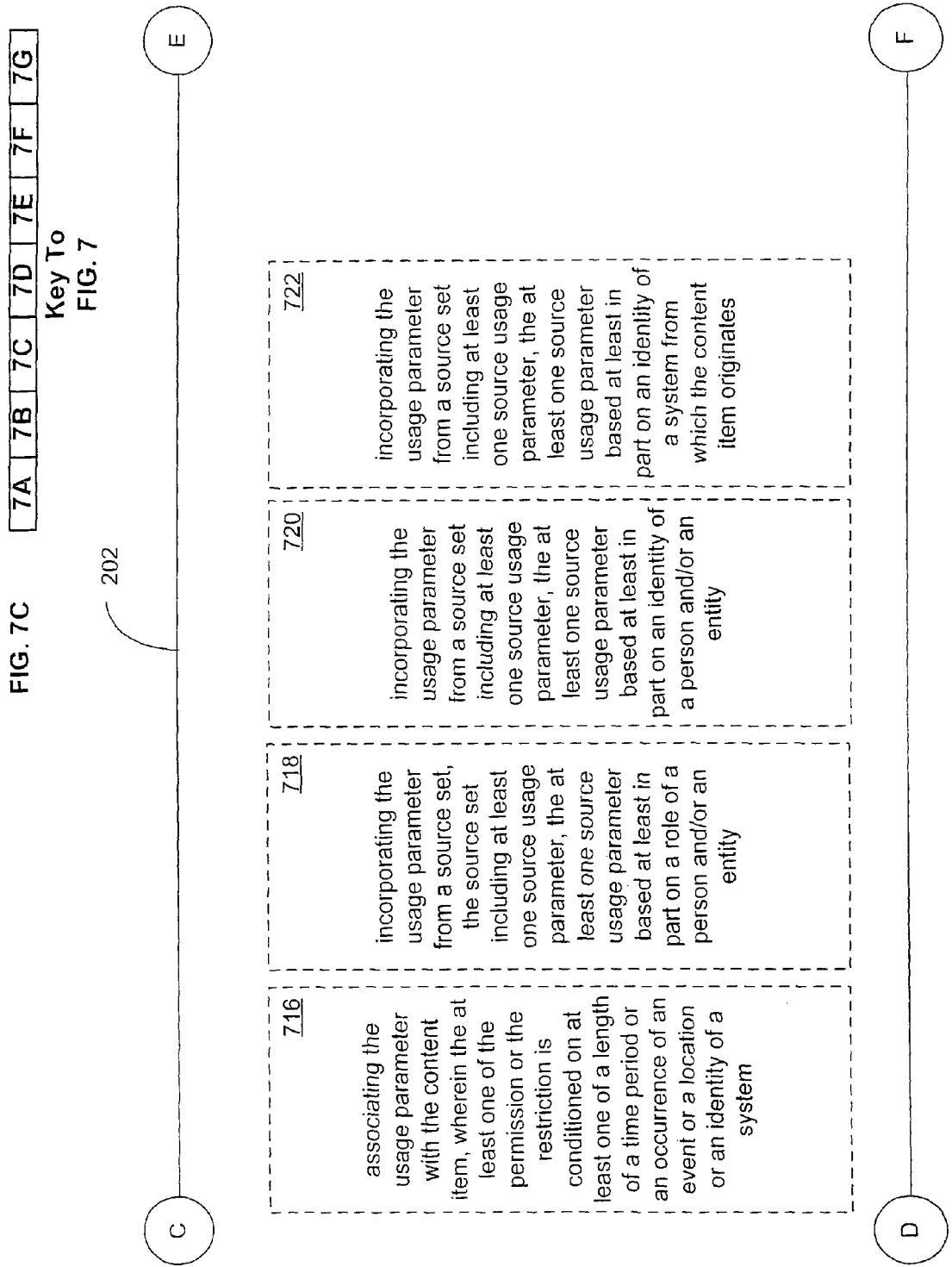

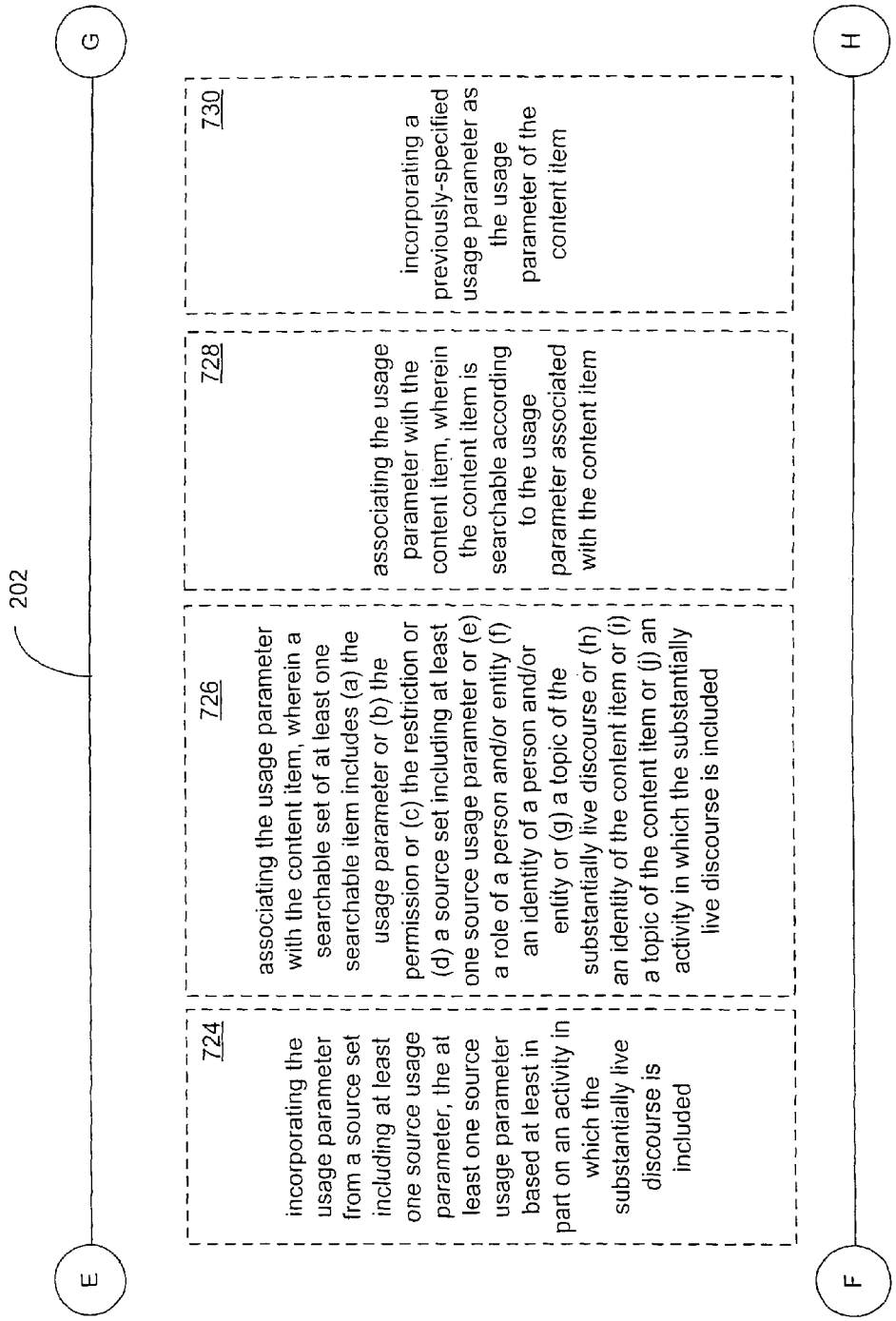

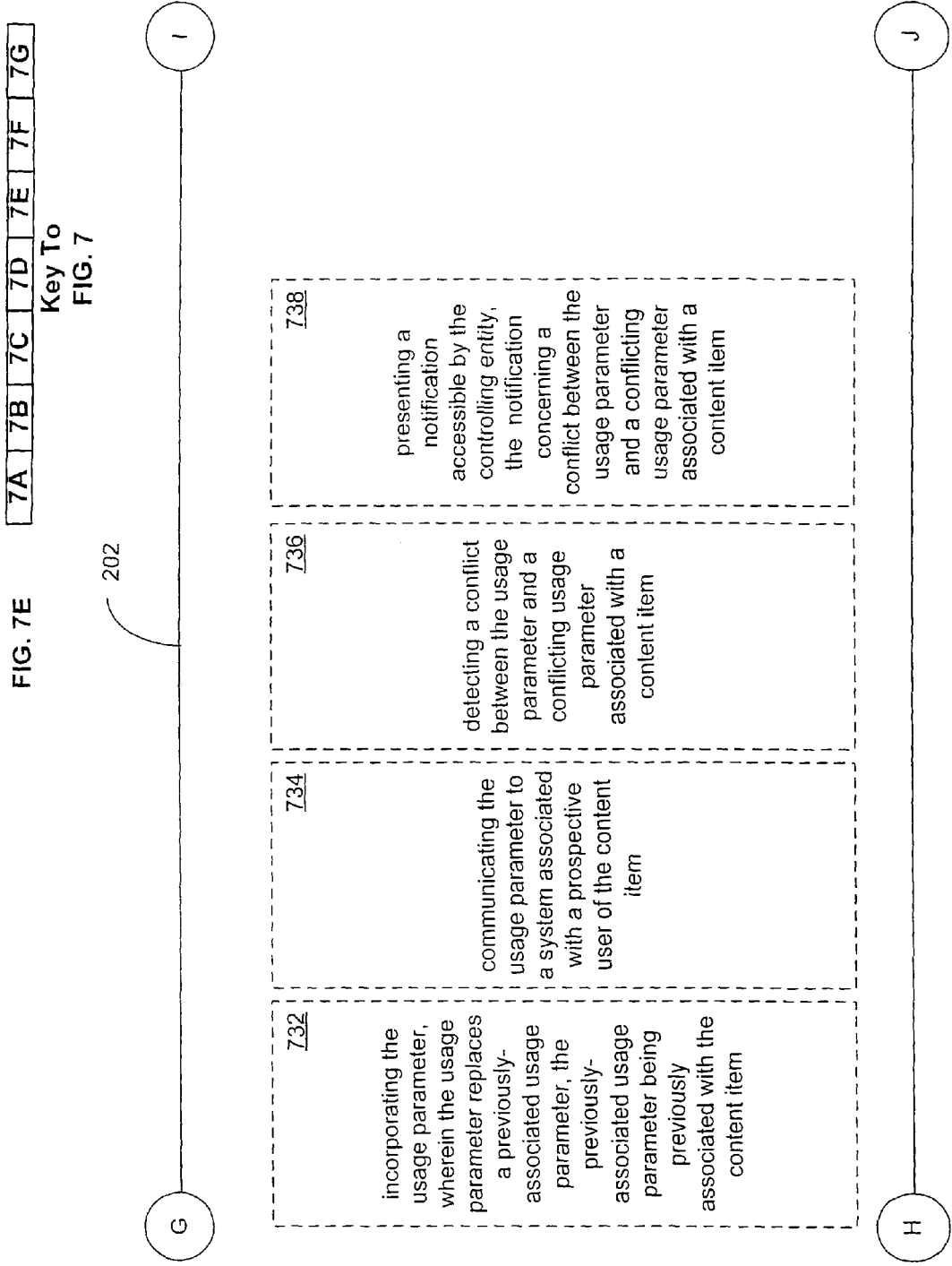

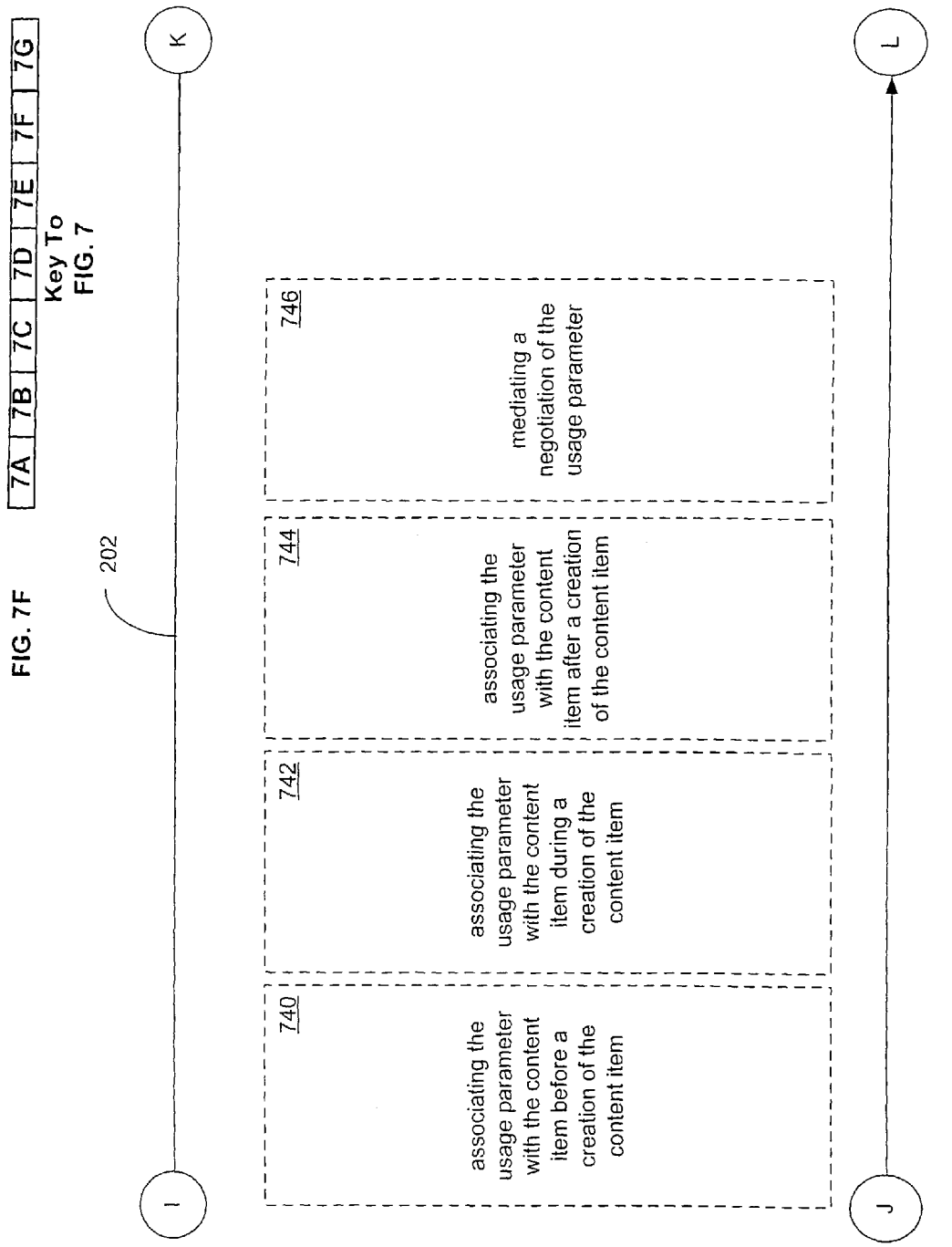

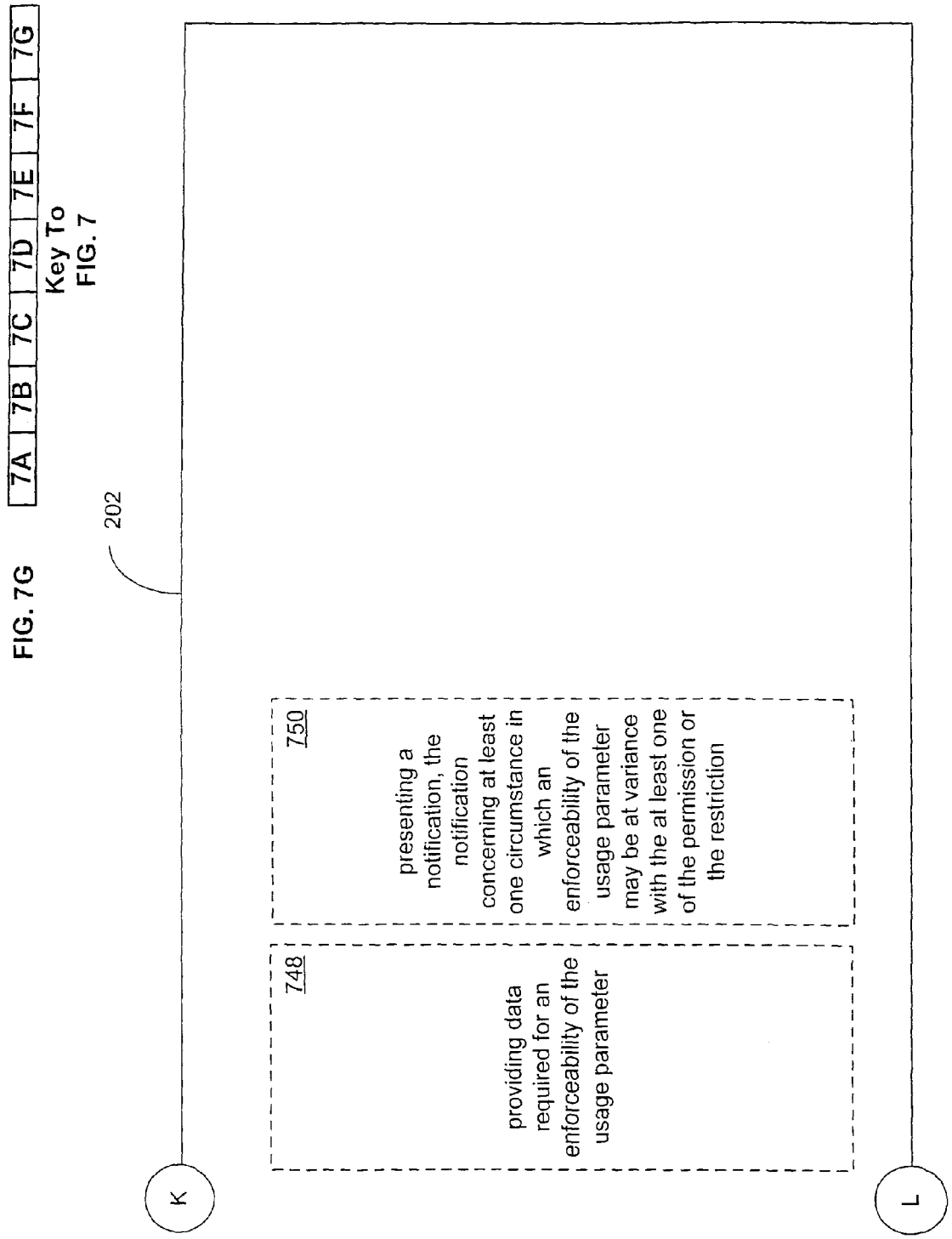

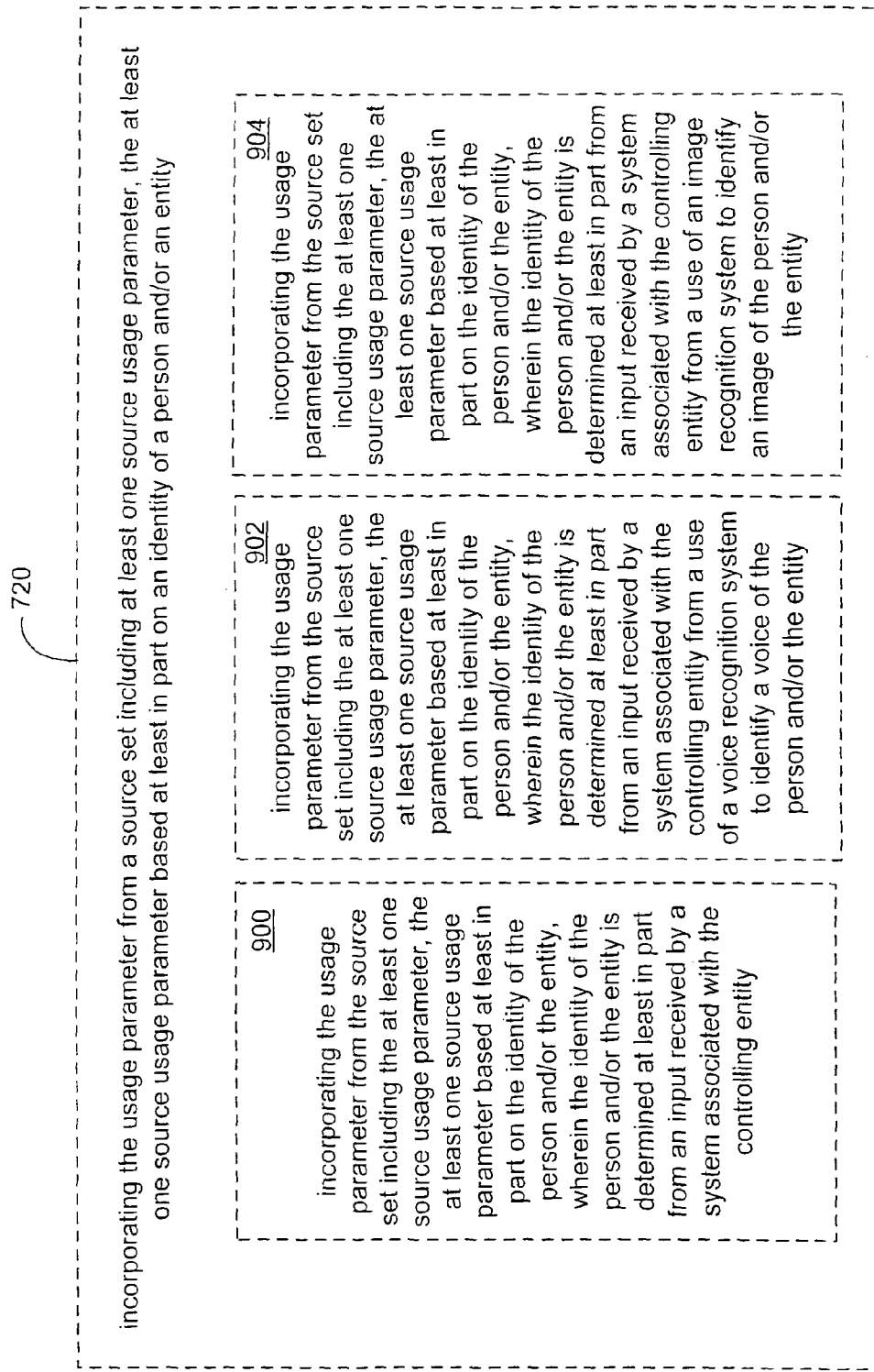

FIG. 10

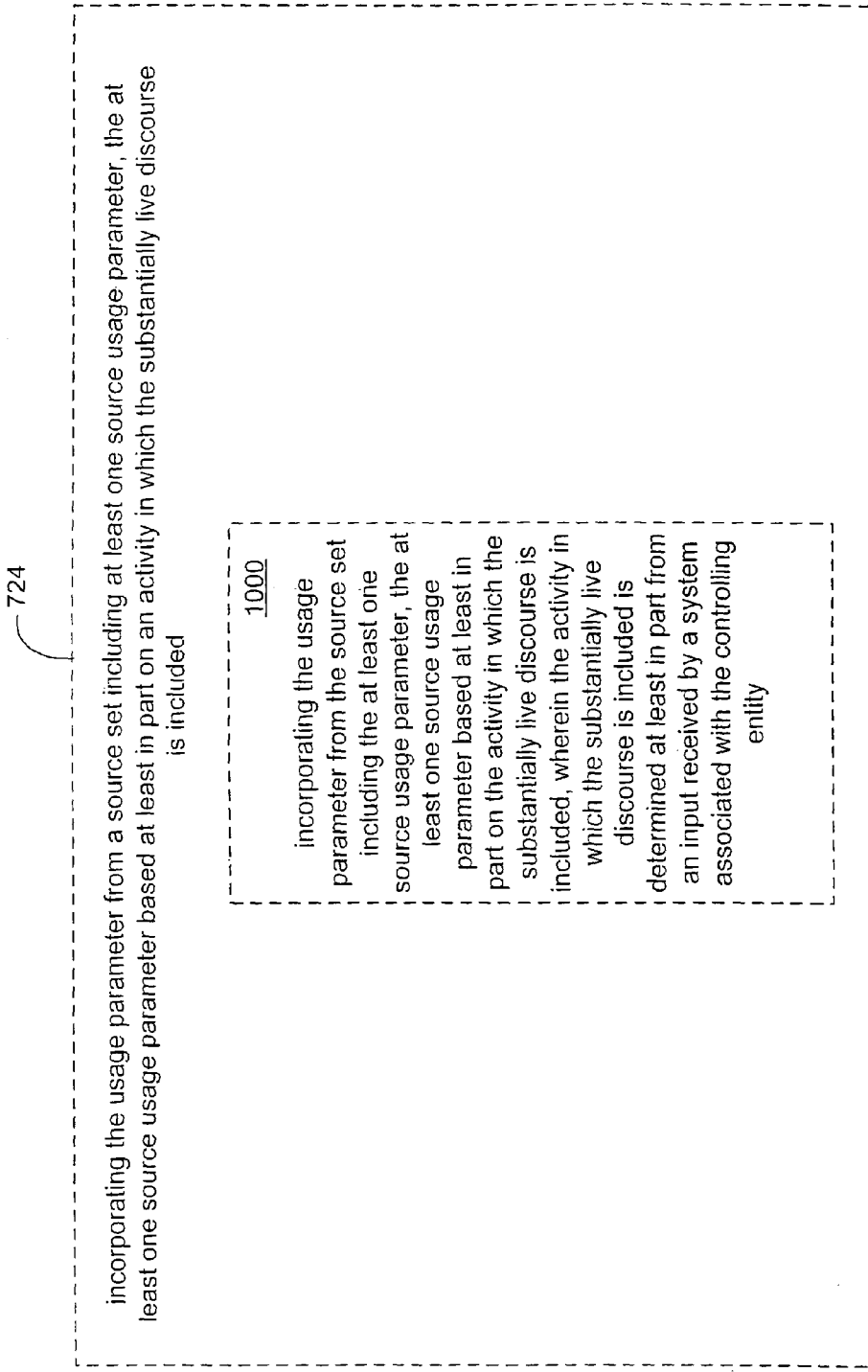

724 incorporating the usage parameter from a source set including at least one source usage parameter, the at least one source usage parameter based at least in part on an activity in which the substantially live discourse is included

1000 incorporating the usage parameter from the source set including the at least one source usage parameter, the at least one source usage parameter based at least in part on the activity in which the substantially live discourse is included, wherein the activity in which the substantially live discourse is included is determined at least in part from an input received by a system associated with the controlling entity

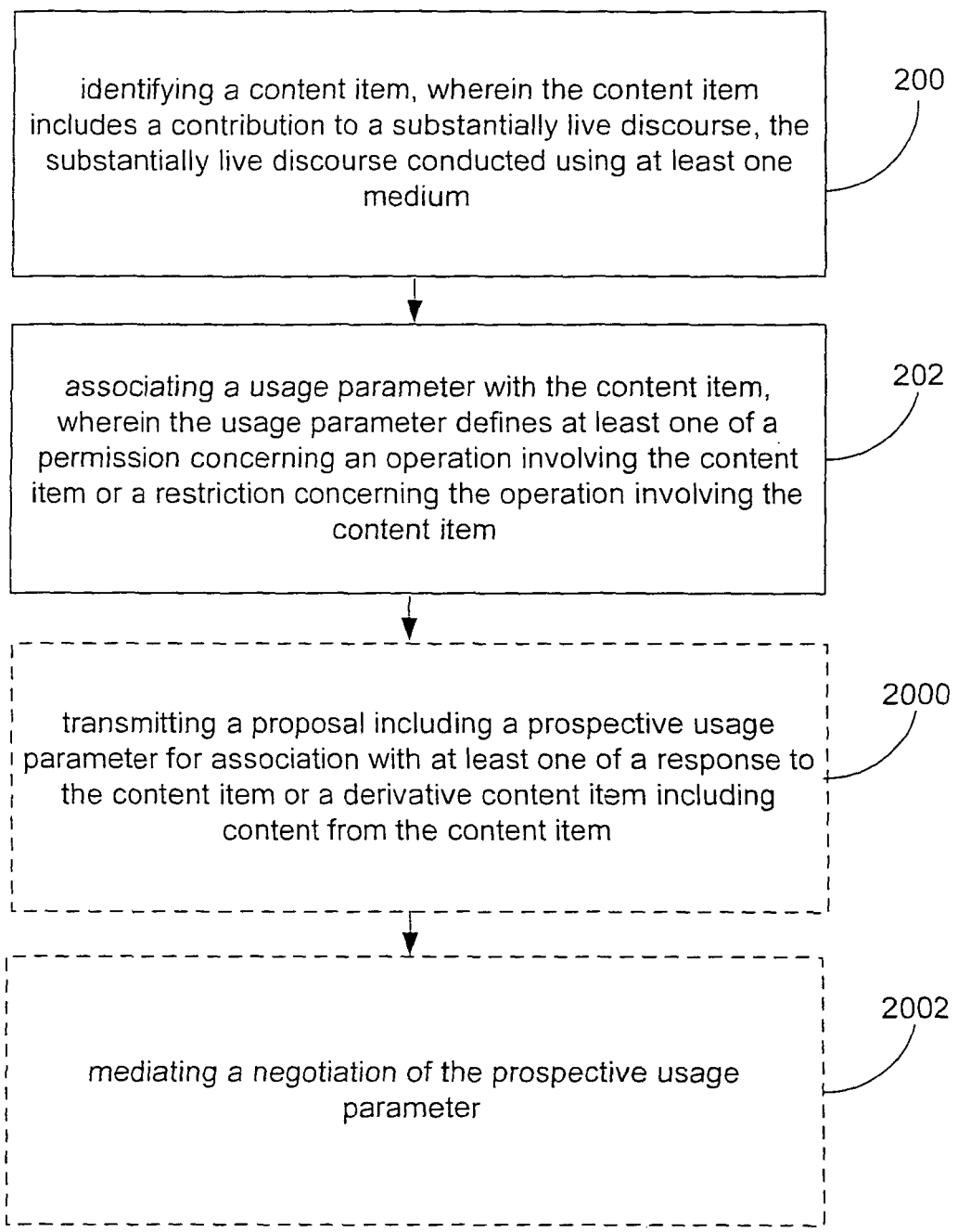

USAGE PARAMETERS FOR COMMUNICATION CONTENT

CROSS REFERENCE TO RELATED APPLICATIONS

The present application is related to and claims the benefit of the earliest available effective filing date(s) from the following listed applications (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

1. For purposes of the USPTO extra-statutory requirements, the present application constitutes a continuation-in-part of U.S. patent application Ser. No. 11/480,773, entitled Usage Parameters for Communication Content, naming Alexander J. Cohen; Edward K. Y. Jung; Royce A. Levien; Robert W. Lord; Mark A. Malamud; William Henry Mangione-Smith; John D. Rinaldo, Jr.; and Clarence T. Tegreene as inventors, filed Jun. 30, 2006, which is currently co-pending, or is an application of which a currently co-pending application is entitled to the benefit of the filing date.

The United States Patent Office (USPTO) has published a notice to the effect that the USPTO's computer programs require that patent applicant reference both a serial number and indicate whether an application is a continuing or continuing-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant has provided above a specific reference to the application(s) from which priority is being claimed as recited by statute. Applicant understands that the statute is unambiguous in its specific reference language and does not require either a serial number or any characterization, such as "continuing" or "continuing-in-part," for claiming priority to U.S. patent applications. Notwithstanding the foregoing, Applicant understands that the USPTO's computer programs have certain data entry requirements, and hence Applicant is designating the present application as a continuing-in-part of its parent applications as set forth above, but expressly points out that such designations are not to be construed in any way as any type of commentary and/or admission as to whether or not the present application contains any new matter in addition to the matter of its parent application(s).

All subject matter of the Related Application and of any and all parent, grandparent, great-grandparent, etc. applications of the Related Applications is incorporated herein by reference to the extent such subject matter is not inconsistent herewith.

TECHNICAL FIELD

The present application relates, in general, to data management.

SUMMARY

In one aspect, a method related to data management includes but is not limited to identifying a content item, wherein the content item includes a contribution to a substantially live discourse, the substantially live discourse conducted using at least one medium; and associating a usage parameter with the content item, wherein the usage parameter specifies at least one of a permission concerning an operation involving the content item or a restriction concerning the operation involving the content item. In addition to the foregoing, other method aspects are described in the claims, drawings, and text forming a part of the present application.

In one aspect, a system related to data management includes but is not limited to circuitry for identifying a content item, wherein the content item includes a contribution to a substantially live discourse, the substantially live discourse conducted using at least one medium; and circuitry for associating a usage parameter with the content item, wherein the usage parameter specifies at least one of a permission concerning an operation involving the content item or a restriction concerning the operation involving the content item. In addition to the foregoing, other system aspects are described in the claims, drawings, and text forming a part of the present application.

In one or more various aspects, related systems include but are not limited to circuitry and/or programming and/or electro-mechanical devices and/or optical devices for effecting the herein-referenced method aspects; the circuitry and/or programming and/or electro-mechanical devices and/or optical devices can be virtually any combination of hardware, software, and/or firmware configured to effect the herein-referenced method aspects depending upon the design choices of the system designer skilled in the art.

In one aspect, a program product includes but is not limited to a signal bearing medium bearing one or more instructions for identifying a content item, wherein the content item includes a contribution to a substantially live discourse, the substantially live discourse conducted using at least one medium; and one or more instructions for associating a usage parameter with the content item, wherein the usage parameter specifies at least one of a permission concerning an operation involving the content item or a restriction concerning the operation involving the content item. In addition to the foregoing, other program product aspects are described in the claims, drawings, and text forming a part of the present application.

In addition to the foregoing, various other method, system, and/or program product aspects are set forth and described in the teachings such as the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 3 depicts several alternative implementations of the high-level logic flowchart of FIG. 2;

FIG. 5 depicts several alternative implementations of the high-level logic flowchart of FIG. 3;

FIG. 6 depicts several alternative implementations of the high-level logic flowchart of FIG. 3;

FIG. 9 depicts several alternative implementation of the high-level logic flowchart of FIG. 7;

FIG. 10 shows an alternative implementation of the high-level logic flowchart of FIG. 7;

FIG. 20 illustrates a high-level logic flowchart of an operational process.

The use of the same symbols in different drawings typically indicates similar or identical items.

DETAILED DESCRIPTION

Figure 1B:
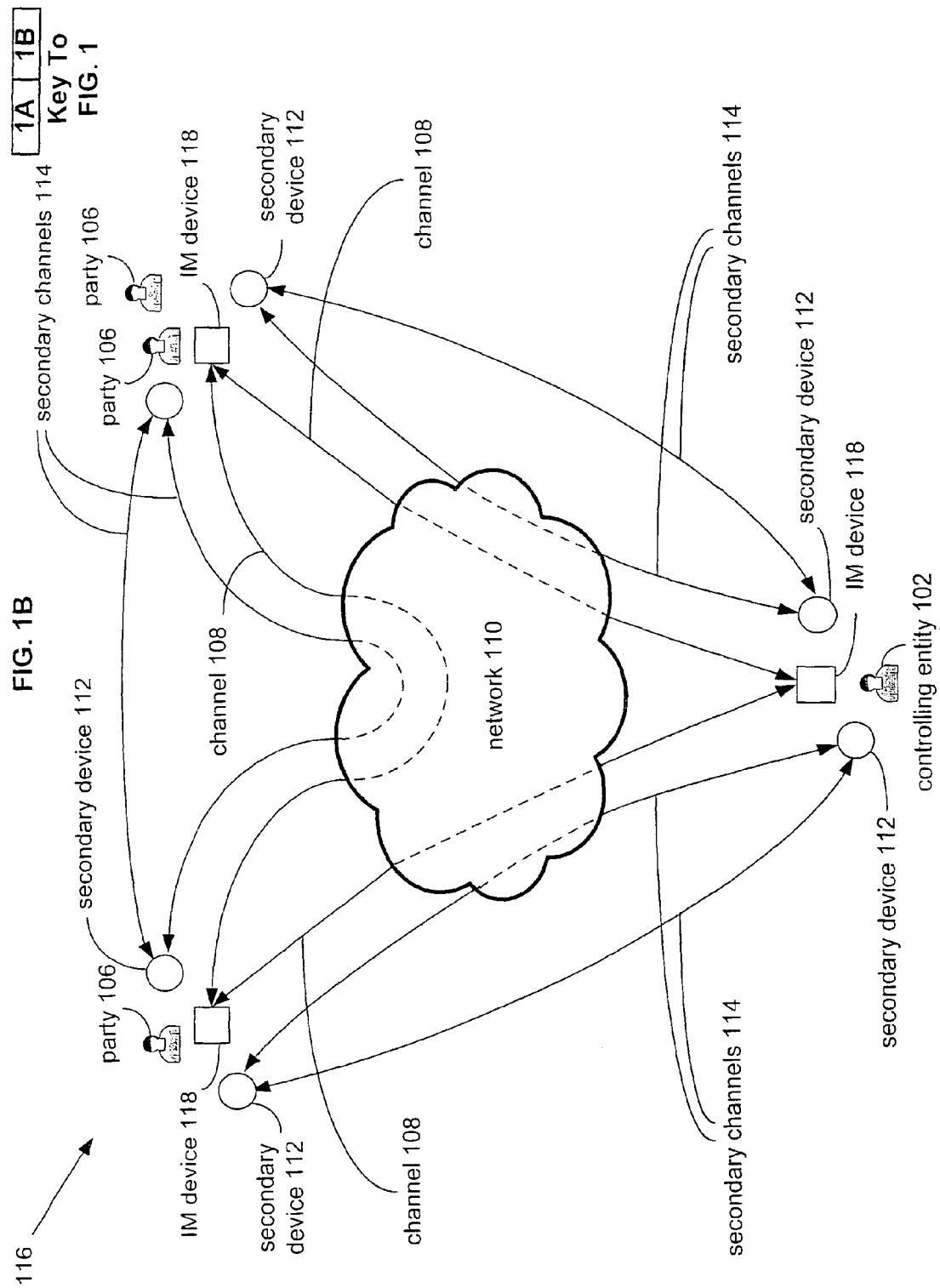
FIG. 1 depicts two exemplary environments in which the methods and systems described herein may be represented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1A:
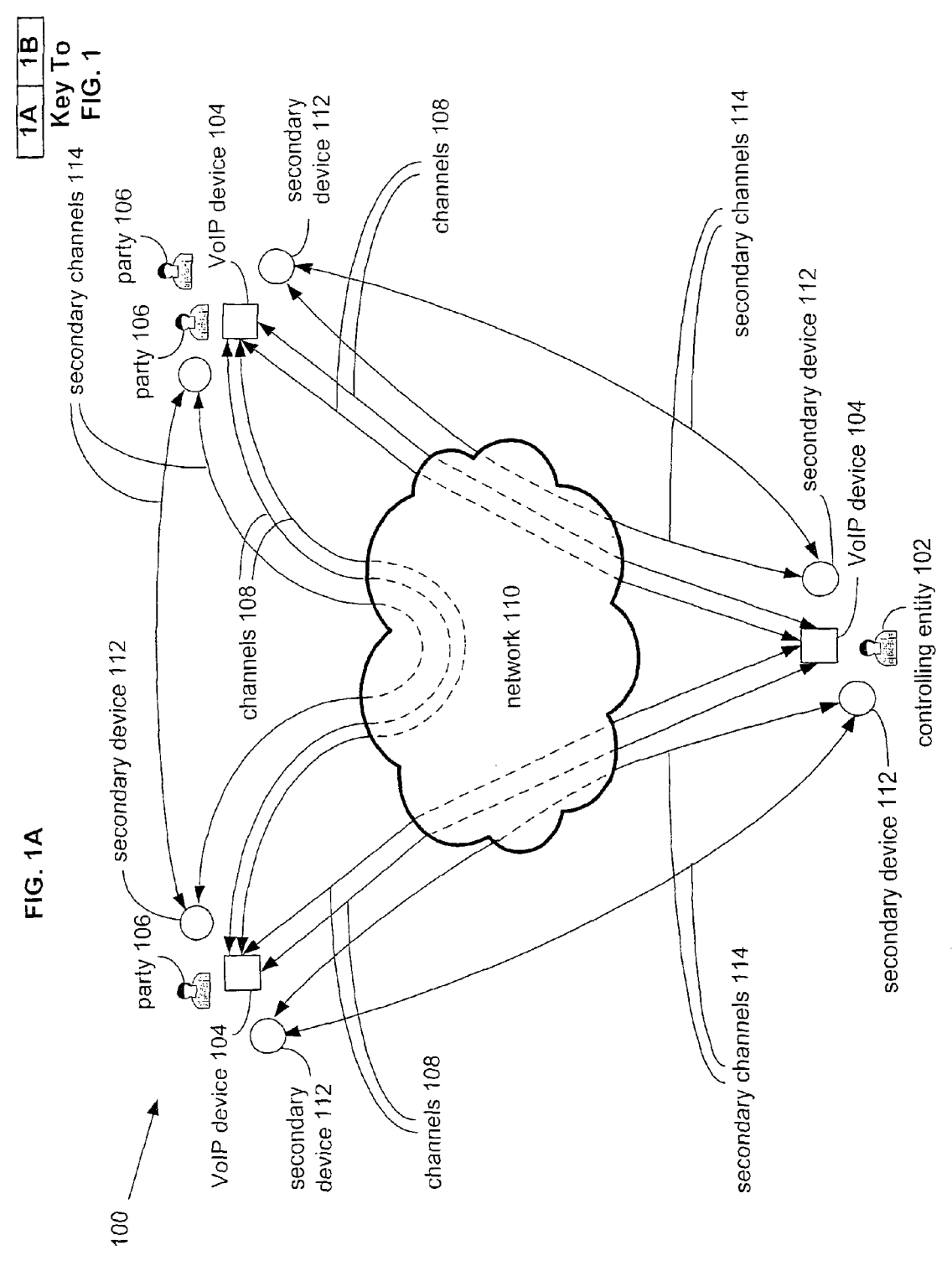

FIG. 1 depicts two exemplary environments in which the methods and systems described herein may be represented. Exemplary environment 100 depicts a controlling entity 102. In the exemplary environment 100, the controlling entity 102 may be a person or persons or an entity, e.g., one or more individuals acting on his, her, or their own behalf and/or on behalf of a corporate entity such as a group, partnership, or corporation, and/or as a member of, or as, a group such as an inventive entity, a group of authors, or a team of lawyers. In the exemplary environment 100, the controlling entity 102 is shown interacting in a substantially live discourse with other persons and/or entities, herein called the parties 106, on a Voice over Internet Protocol ("VoIP") teleconference. In the exemplary environment 116, the controlling entity 102 is shown interacting with other parties 106 using instant messaging ("IM"). The substantially live discourse includes but is not limited to (1) substantially live discourse in which the controlling entity 102 makes a contribution to the discourse to one or more of the parties 106 and in turn receives one or more contributions to the discourse from one or more of the parties 106; and (2) substantially live discourse in which the controlling entity 102 makes one or more contributions to one or more parties 106 without the one or more parties 106 contributing anything to the discourse.

The controlling entity 102 may play at least two roles in the depicted exemplary environments 100 and 116. First, the controlling entity 102 makes one or more contributions to one or more substantially live discourses taking place over exemplary environments illustrated, where an identifiable content item includes a contribution, and may initiate the identification of the content item. For clarity, the discussion herein refers to a single content item, but one skilled in the art will appreciate that the discussion applies to one or more such content items. The content item may include one or more contributions to a substantially live discourse, and a contribution may include one or more components of a substantially live discourse and/or one or more supporting items of the substantially live discourse, where a component and/or a supporting item may in turn include one or more of a speech or an electronic mail or an instant messaging text or a document or an image file or an audio file or an audio data stream or a video file or a video data stream unless context dictates otherwise. One skilled in the art will recognize that a content item may include content besides one or more components and/or one or more supporting items.

A content item may include but is not limited to content that is protectable as intellectual property, and/or trade secret information, and/or confidential business information, and/or confidential medical information, and/or classified military information, and/or classified intelligence information, and/or privileged information or legal work product or other content protectable under law, regulation, a judicial rule, a judicial order, a rule of professional conduct, a rule of professional ethics, a term of a legal contract, and/or a term of another formal or informal agreement, including a legally unenforceable agreement. The controlling entity 102 need not be the owner, prospective owner, or creator of the content item, or the agent of such an entity owner, prospective owner, or creator to contribute the content item to a substantially live discourse.

A content item may be identified using an input from the controlling entity 102 that is, e.g., at least in part a spoken input (such as a spoken phrase), an interaction with an input device (such as a pressing of an "enter" key on a computer keyboard), or an automatic system operation (such as a command based on an automatic recognition of a spoken phrase from the controlling entity 102). A content item may be temporally non-contiguous, e.g., it may include two or more discrete temporal segments within a substantially live discourse or included on two or more separate substantially live discourse.

Another role of the controlling entity 102 is to initiate the association of one or more usage parameters with the content item. For clarity, the discussion herein refers to a single usage parameter, but one skilled in the art will appreciate that the discussion applies to all such usage parameters. A usage parameter may specify but is not limited to specifying a permission or a restriction associated with an operation concerning the content item, where performance of the operation is regulated by law, regulation, a judicial rule, a judicial order, a rule of professional conduct, a rule of professional ethics, a term of legal contract, and/or a term of another formal or informal agreement, including a legally unenforceable agreement. Such an operation may include but is not limited to copying, accessing, forwarding, retaining, and creating a derivative item incorporating content of the content item. Such a permission or restriction may include but is not limited to conditioning based on factors including but not limited to a length of a time period (such as a period of time during which copying is permitted), location (such as the nation in which a prospective performer or a performer of an operation is located), the devices or devices with which the operation is to be performed (such as an office computer versus a home computer), the role of a performer of the operation (such as the role of a health care provider), the identity of the performer of the operation (such as the identity of a particular attorney with access to a particular case file), the device from which the content item originates (such as a particular hospital computer), or a nature of the activity in which the substantially live discourse is included (such as a long-term series of substantially live discourses about the development of a trade secret process).

Those skilled in the art will appreciate that usage parameters as described herein may typically be implemented utilizing digital rights management ("DRM") technologies and/or modifications/variations in DRM technologies within the ambit of one having skill in the art. However, it will be further appreciated by those skilled in the art that use of such DRM technologies is merely exemplary and other control/security mechanisms within the ambit of those skilled in the art may be utilized in light of the teachings herein.

Exemplary environment 100 depicts a VoIP teleconference in which the controlling entity 102 is participating. The equipment and connections depicted may include wireless equipment and connections and/or hard-wired equipment and connections. A VoIP teleconference may be accessed via an endpoint, which may be a telephone that may be connected directly to a data link that carries data compatible with Transmission Control Protocol/Internet Protocol ("TCP/IP"), often called an IP phone. An endpoint may also be a traditional telephone that has been VoIP-enabled. A VoIP teleconference may also be accessed with a traditional telephone that is operably connected, either locally or through the PSTN, to equipment that converts the traditional telephone's signals to TCP/IP-compatible signals and TCP/IP-compatible signals to signals for the traditional telephone. These exemplary alternatives for devices with which to access a VoIP teleconference are among those represented by the devices 104. The other parties to the VoIP teleconference depicted, parties 106, also use devices 104 and represent any number of persons and/or entities participating in a VoIP conference, with one or more of the parties 106 at each VoIP device 104 being used to access the VoIP teleconference. The depicted exemplary environment 100 includes two channels 108 connecting each of the devices 104 in the VoIP teleconference with each of the other such devices 104. A channel 108 includes but is not limited to the hardware and/or software and/or firmware ("hardware/software/firmware") used to transport one or more IP packets from one endpoint to another endpoint, and, where necessary, any hardware/software/firmware required to carry a signal represented by the one or more IP packets to and from endpoints to the devices 104 to complete the connection between the controlling entity 102 and one or more parties 106 and/or between parties 106. These channels 108 are shown connecting to the devices 104 via the network 110, which is representative of any hardware/software/firmware included in the Internet used to complete the channels 108. The depicted connections through the network 110 do not preclude channels 108 connected to the devices 104 by other routes, such as direct connections and/or indirect connections through computers and/or other hardware/software/firmware that is not included in the Internet. The dotted segments of the channels 108 within the network 110 represent any possible variations of network routing for the channels 108: the routing of the any channel 108 may change during the VoIP teleconference; the routing may be disconnected and re-established; and the routing may be disconnected and another routing created to bring a disconnected VoIP device 104 back into the VoIP teleconference. The solid segments of the segments 108 outside the network 110 represent any possible variations of hardware/software/firmware required to complete a connection between any two devices 104. The segments of each channel 108 together may represent the entirety of a routing required to complete a connection between any two devices 104.

The controlling entity 102 may introduce a contribution that is included by a content item via the VoIP device 104 associated with the controlling entity 102 and/or by hardware/software/firmware operably coupled to that VoIP device 104, and the content item may be communicated to one or more parties 106 via the appropriate channels 108 and/or hardware/software/firmware operably coupled to the appropriate device or devices 104. A usage parameter to be associated with the content item may be associated with the content item via the hardware/software/firmware of the VoIP device 104 associated with the controlling entity 102 and/or via hardware/software/firmware operably coupled to that VoIP device 104. The usage parameter, once associated with the content item, may be communicated to one or more parties 106 via the appropriate channels 108 and a VoIP device 104 associated with the one or more parties 106 and/or hardware/software/firmware operably coupled to the appropriate device or devices 104.

In the context of the exemplary environment 100, the controlling entity 102 may make a contribution that is included in a content item, initiate an identification of the content item, and/or initiate an association of a usage parameter with the content item, via a VoIP device 104 and/or a secondary device 112. Initiation and performance of identification of a content item and/or association of a usage parameter with the content item may also be performed by automated system action, e.g., by a voice recognition system coupled to a database and the communications media and/or systems of the exemplary environment 100.

In the context of a VoIP teleconference such as the VoIP teleconference of exemplary environment 100, a content item may be identified at least in part by the device or devices 104 via which a contribution included in the content item is contributed to the substantially live discourse and/or the channel or channels 108 over which a contribution included in a content item is communicated in the exemplary environment 100.

The exemplary environment 100 illustrated may include secondary communications means such as the secondary devices 112 and secondary channels 114 shown. The secondary devices 112 and the secondary channels 114 illustrated are representative of any number of other means of communication between the controlling entity 102 and the parties 106, such as computers with email software and Internet pathways for email, respectively. The secondary devices 112 and the secondary channels 114 may be used to introduce and carry, respectively, a contribution that is included in a content item. Secondary channels 114 may include or exclude elements of the network 110.

A system associated with the controlling entity 102 and/or a party 106 may include but not be limited to a VoIP device 104 and/or a secondary device 112 and/or hardware/software/firmware operably coupled to the VoIP device 104 and/or the secondary device 112, that is associated with the controlling entity 102 and/or a party 106, respectively.

Parties 106 may act as controlling entities 102 with respect to their own content items including their own contributions to the substantially live discourse, and may associate usage parameters with those content items.

In the exemplary environment 116, the controlling entity 102 is shown interacting by IM with other parties 106 via IM devices 118 associated with the parties 106 using the channels 108. The IM devices 118 may include but are not limited to personal computers, cellular telephones, and personal digital assistants such as Blackberry® devices. The illustrated exemplary environment 116 also shows the controlling entity 102 interacting with the parties 106 via the secondary devices 112 and the secondary channels 114. In the context of the exemplary environment 116, the controlling entity 102 may contribute to a substantially live discourse an IM text or a series of IM texts that are included in a content item, initiate an identification of the content item, and/or initiate an association of a usage parameter with the content item, via an IM device 118 and/or a secondary device 112. Initiation and performance of identification of a content item and/or association of a usage parameter with the content item may also be performed by automated system action, e.g., by a voice recognition system coupled to a database and the communications media and/or systems of the exemplary environment 116. A system associated with the controlling entity 102 and/or a party 106 may include but not be limited to an IM device 118 and/or a secondary device 112 and/or hardware/software/firmware operably coupled to the IM device 118 and/or the secondary device 112, that is associated with the controlling entity 102 and/or a party 106, respectively.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
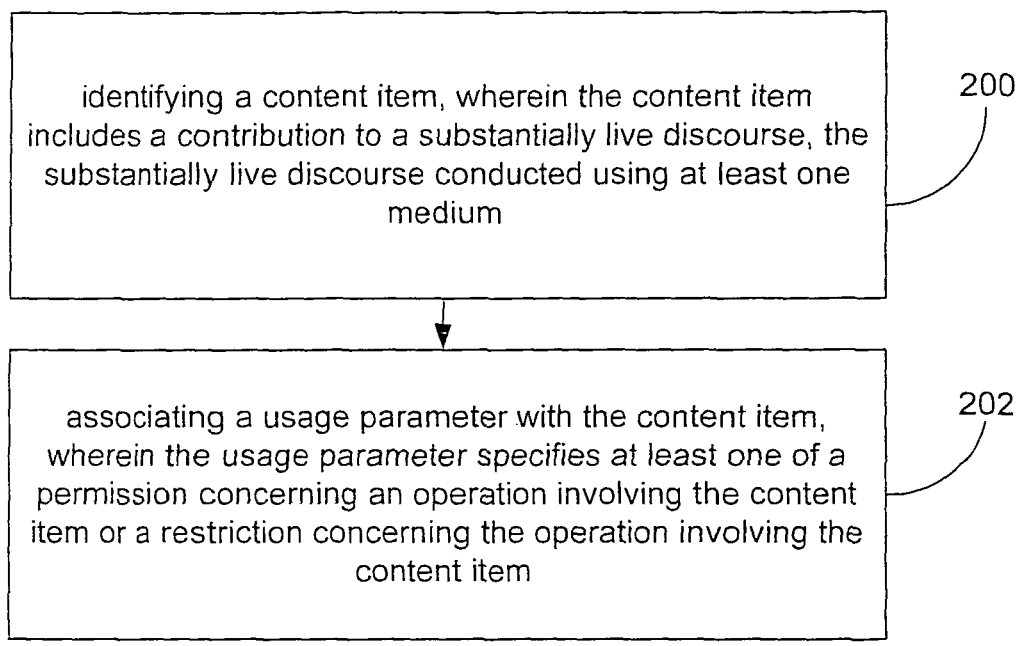
FIG. 2 depicts a high-level logic flowchart of an operational process.

FIG. 2 depicts a high-level logic flowchart of an operational process. The illustrated process may include operation 200 and/or operation 202. Operation 200 shows identifying a content item, wherein the content item includes a contribution to a substantially live discourse, the substantially live discourse conducted using at least one medium.

Operation 200 may include, for example, identifying a content item that includes part or all of a contribution by a person and/or an entity to a conversation in a VoIP teleconference, such as was described in relation to the substantially live discourse of the exemplary environment 100. In this example, a contribution may be made by a controlling entity 102 via a VoIP device 104 and/or a secondary device 112 and one or more channels 108 and/or secondary channels 114, or by a party or parties 106 via a VoIP device 104 and/or a secondary device 112 and one or more channels 108 and/or secondary channels 114. Such a contribution may include one or more of a speech or an electronic mail or an instant messaging text or a document or an image file or an audio file or an audio data stream or a video file or a video data stream unless context dictates otherwise.

Operation 200 may also include, for example identifying a content item that includes part or all of a contribution of a person and/or an entity to a two- or multi-party IM substantially live discourse, such as the substantially live discourse of the exemplary environment 116. In this example, a contribution may be made by a controlling entity 102 via an IM device 118 and/or a secondary device 112 and one or more channels 108 and/or secondary channels 114, or by a party or parties 106 via an IM device 118 and/or a secondary device 112 and one or more channels 108 and/or secondary channels 114. Such a contribution may include one or more of a speech or an electronic mail or an instant messaging text or a document or an image file or an audio file or an audio data stream or a video file or a video data stream unless context dictates otherwise.

The identifying of operation 200 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

The media in which the substantially live discourse of operation 200 may be conducted include, for example, VoIP hardware/software/firmware enabling teleconferencing over the Internet; and/or IM hardware/software/firmware; and/or the PSTN; and/or non-public telecommunications network such as interoffice networks; and/or hard-wired and/or wireless components of all such systems.

Operation 202 depicts associating a usage parameter with the content item, wherein the usage parameter specifies at least one of a permission concerning an operation involving the content item or a restriction concerning the operation involving the content item. Operation 202 may include, for example, associating a usage parameter with a content item as identified in operation 200, where the associating may be performed by a VoIP device 104 and/or a secondary device 112. An IM device 118 and/or a secondary device 112 may also be used, for example, to associate a usage parameter with a content item.

Such a usage parameter may, for instance, include a permission that a controlling entity 102 grants to a person and/or an entity such as a party 106 to perform an operation involving a content item, such as permission to copy and/or distribute the content item to a specified list of persons and/or entities. A usage parameter may also, for example, include a restriction that a controlling entity 102 places on a person and/or an entity such as a party 106 to enjoin performance of an operation involving a content item, such as a restriction enjoining accessing the content item in a location in which the content item would be accessible to non-approved persons and/or entities.

The associating of operation 202 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

FIG. 3 depicts several alternative implementations of the high-level logic flowchart of FIG. 2. Operation 200—identifying a content item, wherein the content item includes a contribution to a substantially live discourse, the substantially live discourse conducted using at least one medium—may include one or more of the following operations: 300, 302, 304, 306, 308, 310, and/or 312.

Operation 300 illustrates identifying the content item using input associated with a controlling entity of the content item.

Operation 300 may include, for instance, identifying a content item using input from a controlling entity 102 (or a party 106 acting in a capacity as a controlling entity 102). The identifying of operation 300 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 302 illustrates identifying the content item, wherein the content item includes the contribution to the substantially live discourse, and wherein the contribution includes a component of the substantially live discourse, the component including at least one of a speech or an electronic mail or an instant messaging text or a document or an image file or an audio file or an audio data stream or a video file or a video data stream. Operation 302 may include, for example, identifying a content item including a contribution of, e.g., a vocal response, a tape recording, or a document file. The identifying of operation 302 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 304 shows identifying the content item, wherein the content item includes the contribution to the substantially live discourse, and wherein the contribution includes a supporting item of the substantially live discourse, the supporting item including at least one of a speech or an electronic mail or an instant messaging text or a document or an image file or an audio file or an audio data stream or a video file or a video data stream. Operation 304 may include, for example, identifying a content item including a contribution that includes a supporting item, such as a document or an image file to which a controlling entity 102 or a party 106 must make reference in her ongoing discourse contribution. Such a supporting item may, for instance, be sent via the same device (e.g., VoIP device 104 and/or secondary device 112 and/or IM device 118) and channel (e.g., channel 108 and/or secondary channel 114) used for a component of the substantially live discourse, or by a different device and/or channel: for example, the component may be on a channel 108 of a VoIP teleconference while a supporting item is on a secondary channel 114. The identifying of operation 304 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 306 depicts identifying the content item, wherein the content item includes at least two non-contiguous temporal segments. Operation 306 may, include, for example, identifying a content item that includes two or more speeches by a controlling entity 102 or a party 106 in a single substantially live discourse, where the two or more speeches are separated in time; or the content item may include one or more speeches selected from two or more distinct substantially live discourses talking place at different times. The substantially live discourses involved in these examples of operation 306 may include substantially live discourses in environments such as those illustrated by one or both of the exemplary environments 100 and 116. The identifying of operation 306 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 308 illustrates identifying the content item, wherein the content item includes a periodically sampled temporal segment of a data stream. Operation 308 may include, for example, identifying a content item that includes a temporal segment such as a one-second segment of a data stream carrying the speech of a controlling entity 102 or a party 106, where the segment is one of a series of segments identified in the stream such that each one-second segment is a separate content item. The identifying of operation 308 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 310 shows identifying the content item, wherein the substantially live discourse is conducted at least in part using Voice over Internet Protocol. Operation 310 may include, for example, identifying a content item including a contribution to a substantially live discourse conducted at least in part using VoIP, as illustrated by exemplary environment 100. The identifying of operation 310 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 312 depicts identifying the content item, wherein the substantially live discourse is conducted at least in part using instant messaging. Operation 312 may include, for example, identifying a content item including a contribution to a substantially live discourse conducted at least in part using instant massaging, as shown by exemplary environment 116. The identifying of operation 312 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Figure 4:
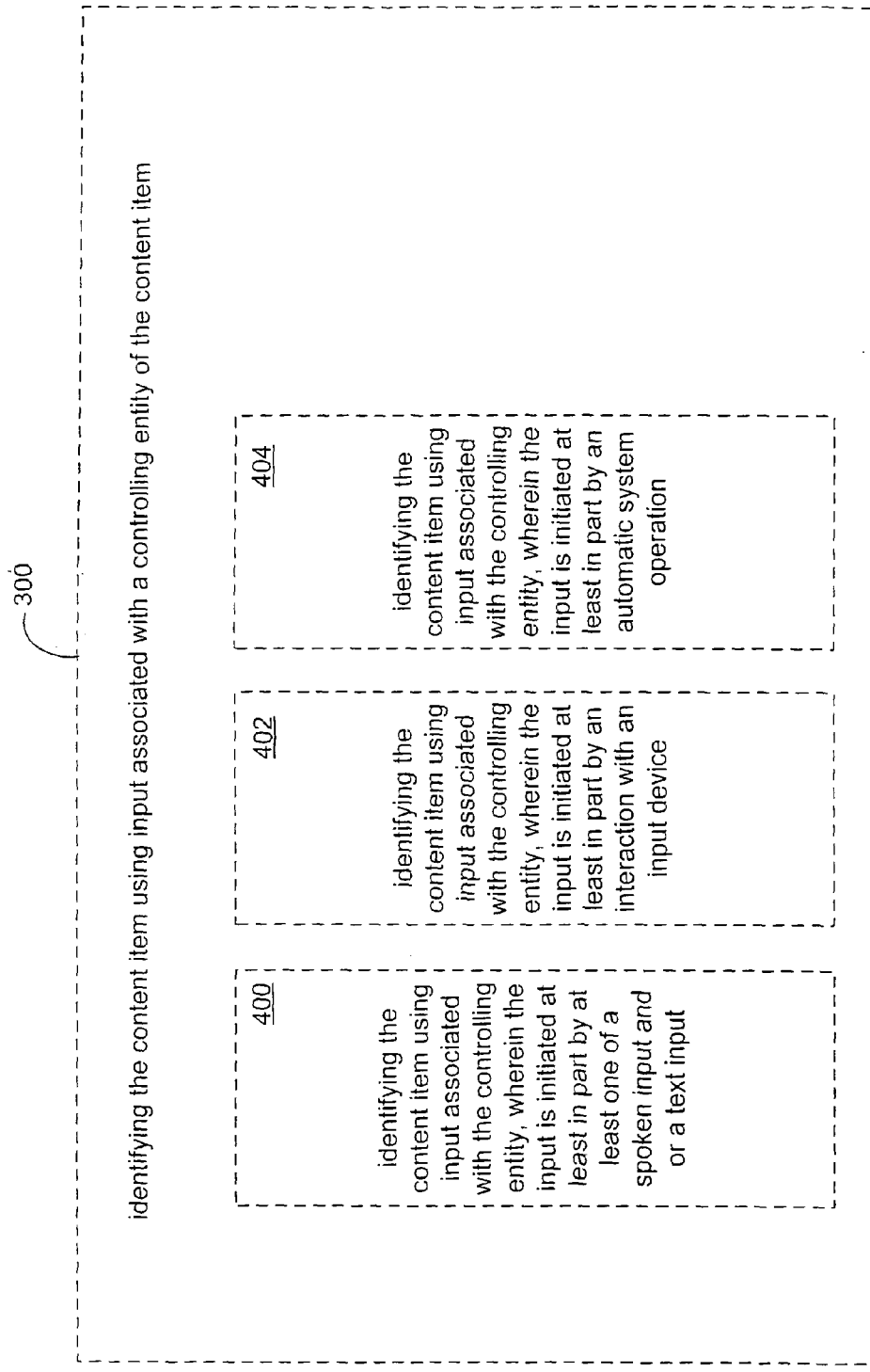
FIG. 4 depicts several alternative implementations of the high-level logic flowchart of FIG. 3.

FIG. 4 depicts several alternative implementations of the high-level logic flowchart of FIG. 3. Operation 300-identifying the content item using input associated with a controlling entity of the content item—may include one or more of the following operations: 400, 402, and/or 404.

Operation 400 illustrates identifying the content item using input associated with the controlling entity, wherein the input is initiated at least in part by at least one of a spoken input or a text input. Operation 400 may include, for example, identifying a content item using input from a controlling entity 102 initiated by the controlling entity 102 speaking into a microphone for a voice and/or speech recognition system associated with a device 104 to detect a code word, or by the controlling entity 102 typing a word into an IM device 118. The identifying of operation 400 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 402 shows identifying the content item using input associated with the controlling entity, wherein the input is initiated at least in part by an interaction with an input device. Operation 402 may include, for example, identifying a content item using input from a controlling entity 102 initiated by the controlling entity 102 using a mouse input device to interact with a graphical user interface of a secondary device 112. The identifying of operation 402 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 404 depicts identifying the content item using input associated with the controlling entity, wherein the input is initiated at least in part by an automatic system operation. Operation 404 may include, for example, identifying a content item using input from a controlling entity 102 initiated by a speech and a voice recognition system using hardware/software/firmware of a VoIP device 104 to detect automatically a prespecified phrase denoting a content item of interest to a controlling entity 102. The identifying of operation 404 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

FIG. 5 depicts several alternative implementations of the high-level logic flowchart of FIG. 3. Operation 310—identifying the content item, wherein the substantially live discourse is conducted at least in part using Voice over Internet Protocol—may include one or more of the following operations: 500 and/or 502.

Operation 500 shows identifying the content item, wherein the content item includes the contribution to the substantially live discourse transmitted via a specified device. Operation 500 may include, for example, identifying a content item including data contributed to the substantially live discourse via a particular endpoint such as VoIP device 104 where it represents a VoIP endpoint. The identifying of operation 500 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 502 illustrates identifying the content item, wherein the content item includes the contribution to the substantially live discourse communicated via a specified channel. Operation 502 may include, for example, identifying a content item including data carried in one or more particular channels, such as channel 108 or as secondary channel 114. The identifying of operation 502 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels FIG. 6 depicts several alternative implementations of the high-level logic flowchart of FIG. 3. Operation 312—identifying the content item, wherein the substantially live discourse is conducted at least in part using instant messaging—may include operation 600.

Operation 600 shows identifying the content item, wherein the content item includes the contribution to the substantially live discourse transmitted via a specified instant messaging device. Operation 600 may include, for example, identifying a content item including IM messages originating from a particular IM device 118. The identifying of operation 600 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Figure 7B:
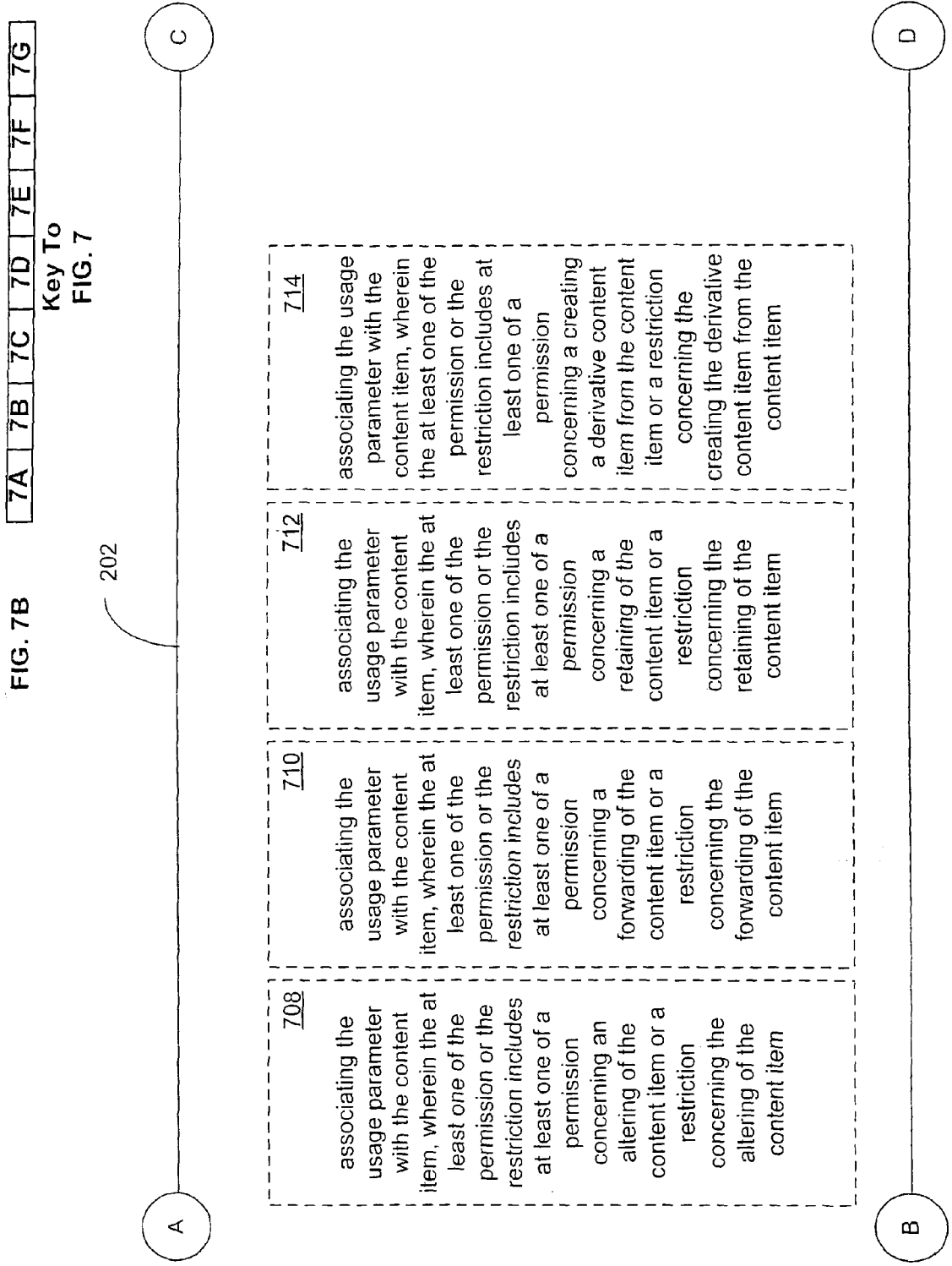
FIG. 7 depicts several alternative implementations of the high-level logic flowchart of FIG. 2.

FIG. 7 depicts several alternative implementations of the high-level logic flowchart of FIG. 2. Operation 202 may include one or more of the following operations: 700, 702, 704, 706, 708, 710, 712, 714, 716, 718, 720, 722, 724, 726, 728, 730, 732, 734, 736, 738, 740, 742, 744, 746, 748, and/or 750.

Operation 700 depicts associating the usage parameter with the content item, wherein the usage parameter includes an identifier that identifies the content item. Operation 700 may include, for example, associating a usage parameter with a content item such that the usage parameter includes a unique code group identifier that serves to identify a content item that includes a speech contribution from a controlling entity 102. The associating of operation 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 702 shows associating the usage parameter with the content item, wherein the usage parameter is communicable separately from the content item. Operation 702 may include, for example, associating a usage parameter with a content item such that the usage parameter may be sent by a VoIP device 104 over a channel 108 while the content item may be sent by a secondary device 112 over a secondary channel 114. The associating of operation 702 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 704 illustrates associating the usage parameter with the content item, wherein the at least one of the permission or the restriction includes at least one of a permission concerning a copying of the content item or a restriction concerning the copying of the content item. Operation 704 may include, for example, associating a usage parameter with a content item such that the usage parameter includes a permission from the controlling entity 102 for the recipient, e.g., a party 106, to copy the content item seven times (or to make seven copies), and/or a restriction on the recipient not to copy the content item eight or more times (or not to make eight or more copies). The associating of operation 704 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 706 depicts associating the usage parameter with the content item, wherein the at least one of the permission or the restriction includes at least one of a permission concerning an accessing of the content item or a restriction concerning the accessing of the content item. Operation 706 may include, for example, associating a usage parameter with a content item such that the usage parameter includes a permission from the controlling entity 102 for the recipient, e.g., a party 106, to read and/or to listen to and/or to view the content item for one month after the party receives the content item, and/or a restriction on the devices 104 and the secondary devices 112 with which the content item may be read and/or listened to and/or viewed. The associating of operation 706 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 708 illustrates associating the usage parameter with the content item, wherein the at least one of the permission or the restriction includes at least one of a permission concerning an altering of the content item or a restriction concerning the altering of the content item. Operation 708 may include, for example, associating a usage parameter with a content item such that the usage parameter includes a permission from the controlling entity 102 for the recipient, e.g., a party 106, to edit a content item including a document and/or a restriction by the controlling entity 102 on the party 106 from altering a content item including an image file. The associating of operation 708 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 710 shows associating the usage parameter with the content item, wherein the at least one of the permission or the restriction includes at least one of a permission concerning a forwarding of the content item or a restriction concerning the forwarding of the content item. Operation 710 may include, for example, associating a usage parameter with a content item such that the usage parameter includes a permission from the controlling entity 102 for the recipient, e.g., a party 106, to forward the content item to anyone, such as a party 106, on an approved list of recipients, and/or a restriction by the controlling entity 102 on the party 106 on forwarding the content item to persons and/or entities on a list of disapproved candidates to receive the content item. The associating of operation 710 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 712 shows associating the usage parameter with the content item, wherein the at least one of the permission or the restriction includes at least one of a permission concerning a retaining of the content item or a restriction concerning the retaining of the content item. Operation 712 may include, for example, associating a usage parameter with a content item such that the usage parameter includes a permission from the controlling entity 102 for the recipient, e.g., a party 106, to retain the content item for a prespecified period of one year, or a permission to retain the content item at a degraded resolution after a prespecified period of one month, and/or a restriction from the controlling entity 102 on the party 106 not retain the content item after a specified period of usefulness, e.g., the pendancy of a course of medical treatment or of a lawsuit. The associating of operation 712 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 714 depicts associating the usage parameter with the content item, wherein the at least one of the permission or the restriction includes at least one of a permission concerning a creating a derivative content item from the content item or a restriction concerning the creating the derivative content item from the content item. Operation 714 may include, for example, associating a usage parameter with a content item such that the usage parameter includes a permission from the controlling entity 102 for the recipient, e.g., a party 106, to create a summary of the content item, and/or a restriction from the controlling entity 102 on the party 106 restricting party 106 from using extracts from the content item in the creation of a derivative content items including a summary. The associating of operation 714 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 716 depicts associating the usage parameter with the content item, wherein the at least one of the permission or the restriction is conditioned on at least one of a length of a time period or an occurrence of an event or a location or an identity of a system. Operation 716 may include, for example, associating a usage parameter with a content item such that the usage parameter's permission and/or restriction depends on a length of a time period (e.g., no forwarding after six months from receipt); an occurrence of an event (e.g., no editing after final approval of a document); a location (e.g., accessing the content item over a secure wireless network connection, and/or accessing over a normally used computer dock, and/or accessing over a system not normally used until identified, for instance, biometrically); or a system (e.g., accessing the content item only from a computer in the workplace or from a particular cellular phone as identified, for instance, by its subscriber identity module ("SIM") card). The associating of operation 716 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 718 shows incorporating the usage parameter from a source set, the source set including at least one source usage parameter, the at least one source usage parameter based at least in part on a role of a person and/or an entity. Operation 718 may include, for instance, incorporating a usage parameter from a set of source usage parameters, where one or more of the source usage parameters are based in part on a role of a party 106, e.g., the usage parameter specifies a permission for the party 106 to access a medical record included in the content item because the party 106 is a doctor on the patient's medical team; or, e.g., the usage parameter specifies a restriction for the party 106 to access a privileged document included in the content item because the party 106 is an opposing attorney in a lawsuit. The incorporating of operation 718 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 720 illustrates incorporating the usage parameter from a source set including at least one source usage parameter, the at least one source usage parameter based at least in part on an identity of a person and/or an entity. Operation 720 may include, for example, incorporating a usage parameter from a set of source usage parameters, where one or more of the source usage parameters is based in part on an identity of a party 106, e.g., the usage parameter specifies a permission for the party 106 to copy a content item as a specific person; or, e.g., the usage parameter specifies a restriction on the party 106 from accessing a document because the party 106 is on a list of disapproved individuals. The incorporating of operation 720 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 722 depicts incorporating the usage parameter from a source set including at least one source usage parameter, the at least one source usage parameter based at least in part on an identity of a system from which the content item originates. Operation 722 may include, for example, incorporating a usage parameter from a set of source usage parameters, where one or more of the source usage parameters is based in part on a system including a VoIP device 104, e.g., the usage parameter specifies a permission for the party 106 to retain the content item originating from a particular VoIP device 104 associated with a client represented by the party 106; or, e.g., the usage parameter specifies a restriction on the party 106 from accessing a content item originating from a particular VoIP device 104 associated with a person and/or an entity represented by opposing counsel. The incorporating of operation 722 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 724 shows incorporating the usage parameter from a source set including at least one source usage parameter, the at least one source usage parameter based at least in part on an activity in which the substantially live discourse is included. Operation 724 may include, for example, incorporating a usage parameter from a set of source usage parameters, where one or more of the source usage parameters is based in part on an activity including a substantially live discourse, e.g., a controlling entity 102 and parties 106 are engaged over a period of time in a set of teleconferences and meetings concerning inventions, and the usage parameter specifies a permission for a party 106 to access a content item because the content item is from a substantially live discourse that is part of the invention teleconferences and meetings. The incorporating of operation 724 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 726 illustrates associating the usage parameter with the content item, wherein a searchable set of at least one searchable item includes (a) the usage parameter or (b) the permission or (c) the restriction or (d) a source set including at least one source usage parameter or (e) a role of a person and/or entity or (f) an identity of a person and/or entity or (g) a topic of the substantially live discourse or (h) an identity of the content item or (i) a topic of the content item or (j) an activity in which the substantially live discourse is included. Operation 726 may include, for example, associating a usage parameter with a content item, where the usage parameter and/or the content item and/or the permission specified by the usage parameter and/or the restriction specified by the usage parameter are items in a searchable set, and where other items may be included in the searchable set, such as a source set that includes at least one source usage parameter (e.g., a usage parameter that may be selected for association with a content item) and/or a role of a party 106 (e.g., a role of a party 106 as a health care provider) and/or an identity of a controlling entity 102 (e.g., the identity of the controlling entity 102 as established by, for instance, a fingerprint) and/or a topic of the substantially live discourse (e.g., a particular lawsuit as a topic) and/or a topic of a content item (e.g., a particular assessment of a patient's chances of recovery) and/or an activity in which the substantially live discourse is included (e.g., continuing treatment of a medical patient). The associating of operation 726 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 728 shows associating the usage parameter with the content item, wherein the content item is searchable according to the usage parameter associated with the content item. Operation 728 may include, for example, associating a usage parameter with a content item, where a search may be conducted on the content item based on the usage parameter associated with it, e.g., a content item includes an audio file originating at a particular VoIP device 104, and a usage parameter associated with it specifies a permission and/or a restriction based on origination at the particular VoIP device 104, so a search conducted for content items may find it using a search for content items with associated usage parameters specifying a permission and/or a restriction based on origination at the particular VoIP device 104. The associating of operation 728 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 730 depicts incorporating a previously-specified usage parameter as the usage parameter of the content item. Operation 730 may include, for example, incorporating a usage parameter that was associated with a content item including a document contributed to a substantially live discourse concerning a particular patient's medical condition, in a usage parameter being associated with a content item including an image file of an x-ray scan, thereby incorporating the same permissions and/or restrictions specified by the previously-associated usage parameter. The incorporating of operation 730 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 732 shows incorporating the usage parameter, wherein the usage parameter replaces a previously-associated usage parameter, the previously-associated usage parameter being previously associated with the content item. Operation 732 may include, for instance, incorporating a usage parameter to replace a usage parameter previously associated with a content item, replacing the permissions and/or restrictions specified by the previously-associated usage parameter with the permissions and/or restrictions specified by the replacement usage parameter. The incorporating of operation 732 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 734 illustrates communicating the usage parameter to a system associated with a prospective user of the content item. Operation 734 may include, for instance, communicating a usage parameter to a system including a secondary device 112 associated with a party 106, where the party 106 is a prospective user of a content item with which the usage parameter is associated, e.g., a record of a previous conversation between a doctor and her patient, and where the communicated usage parameter specifies a permission related to accessing and a restriction related to retaining the record. In this example the party 106 may review the usage parameter before the content item is made available to her. The communicating of operation 734 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 736 depicts detecting a conflict between the usage parameter and a conflicting usage parameter associated with a content item. Operation 736 may include, for instance, detecting a conflict between a usage parameter associated with a content item including a contribution to the substantially live discourse by a controlling entity 102 via a VoIP device 104, and a usage parameter associated with a content item including a contribution to the substantially live discourse by a party 106 via another VoIP device 104. For example, the two content items, for instance, an interview by a reporter (party 106) of a celebrity (controlling entity 102) share content, and the permissions and/or restrictions specified by the two usage parameters are incompatible, e.g., the usage parameter from the controlling entity 102 specifies a restriction on distributing the content item, while the usage parameter from the party 106 grants permission for distributing the content item. The detecting of operation 736 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 738 shows presenting a notification accessible by the controlling entity, the notification concerning a conflict between the usage parameter and a conflicting usage parameter associated with a content item. Operation 738 may include, for example, presenting a notification of a conflict between a usage parameter associated with a content item including a contribution to the substantially live discourse by a controlling entity 102 via a VoIP device 104, and a usage parameter associated with a content item including a contribution to the substantially live discourse by a party 106 via another VoIP device 104. For example, the two content items, for instance, an interview by a reporter (party 106) of a celebrity (controlling entity 102) share content, and the permissions and/or restrictions specified by the two usage parameters are incompatible, e.g., the usage parameter from the controlling entity 102 specifies a restriction on distributing the content item, while the usage parameter from the party 106 grants permission for distributing the content item. Further, in this example, a notification of the conflict is presented to the VoIP device 104 associated with controlling entity 102. The presenting of operation 738 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 740 depicts associating the usage parameter with the content item before a creation of the content item. Operation 740 may include, for example, associating a usage parameter with a content item, where the content item may be identified before it is created, e.g., the content item includes a series of vocal contributions by a controlling entity 102 to a VoIP teleconference that is scheduled but has not yet been held. The associating of operation 740 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 742 shows associating the usage parameter with the content item during a creation of the content item. Operation 742 may include, for instance, associating a usage parameter with a content item, where the content item may be identified while it is being created, e.g., the content item includes a vocal contribution by a controlling entity 102 to a VoIP teleconference, where the usage parameter is associated with the content item while the controlling entity 102 is speaking in the VoIP teleconference. The associating of operation 742 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 744 depicts associating the usage parameter with the content item after a creation of the content item. Operation 744 may include, for example, associating a usage parameter with a content item, where the content item may be identified after it has been created, e.g., the content item includes a video file, where the usage parameter is associated with the content item after the contribution of the content item to the substantially live discourse. The associating of operation 744 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 746 shows mediating a negotiation of the usage parameter. Operation 746 may include, for example, mediating proposals, counter-proposals, and signs of disagreement and/or of agreement between a controlling party 102 and a party 106 as they attempt to reach an agreed position on permission and/or restrictions to be specified by a usage parameter to be associated with a content item. The mediating of operation 746 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 748 depicts providing data required for an enforceability of the usage parameter. Operation 748 may include, for instance, providing any metadata required to enforce the permissions and/or restrictions specified by a usage parameter (where the metadata may include, for instance, usage policies and/or role data and/or identity data) in places such as technical systems (e.g., a local network) and/or locations (e.g., a foreign country), that may not otherwise have a record of and/or access to such metadata. The providing of operation 748 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 750 illustrates presenting a notification, the notification concerning at least one circumstance in which an enforceability of the usage parameter may be at variance with the at least one of the permission or the restriction. Operation 750 may include, for instance, presenting a notification to a system associated with a controlling entity 102 and including a VoIP device 104 associated with the controlling entity 102, where the notification informs of a circumstance in which permissions and/or restrictions specified by the usage parameter may not be enforceable, e.g., a legal restriction in a foreign jurisdiction to which the content item is to be or has been sent, where the legal restriction may prevent enforcement, and/or a technical feature of a network over which the content item is to be sent, where the technical restriction may prevent enforcement. The presenting of operation 750 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Figure 8:
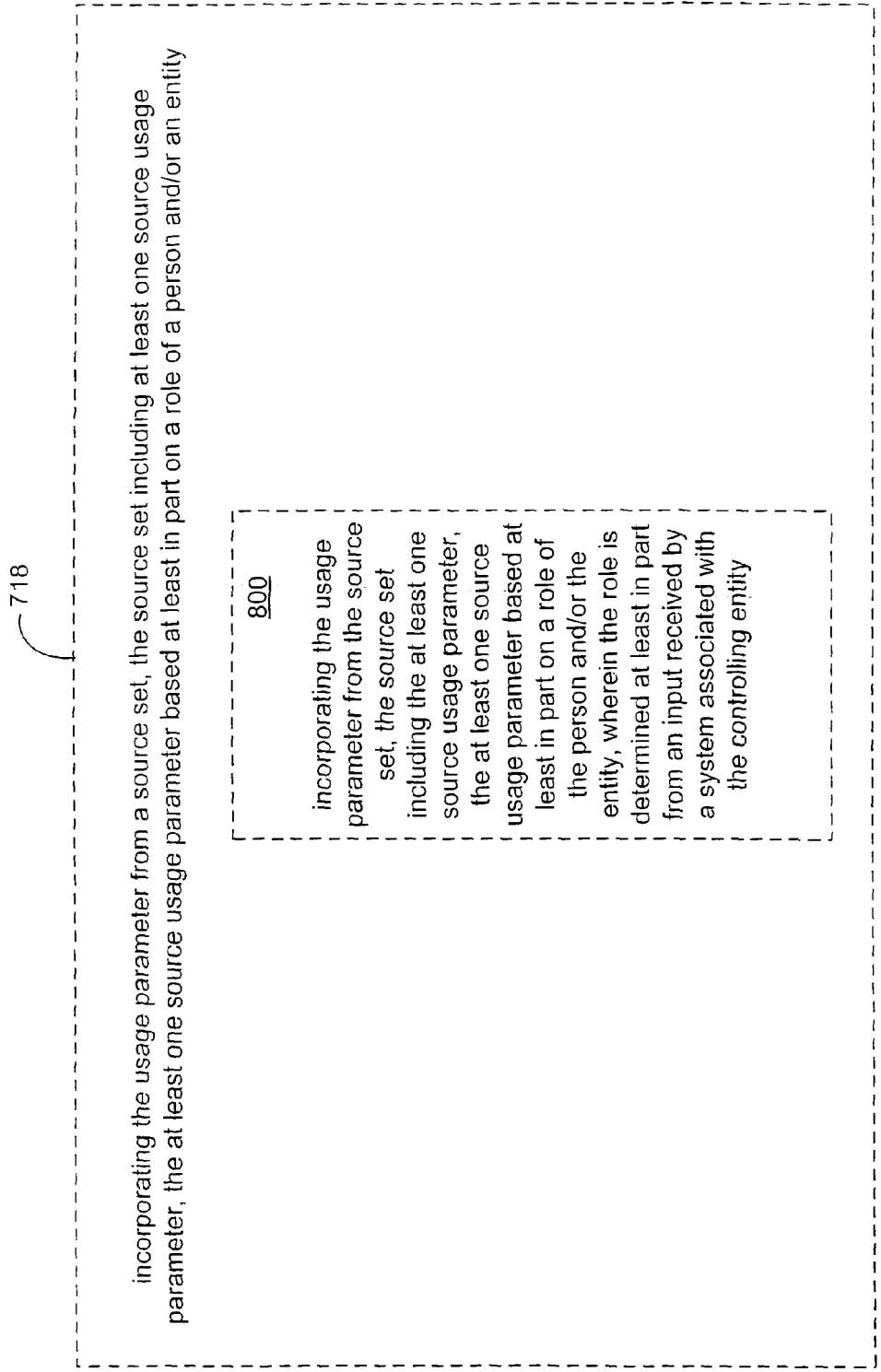
FIG. 8 depicts an alternative implementation of the high-level logic flowchart of FIG. 7.

FIG. 8 depicts an alternative implementation of the high-level logic flowchart of FIG. 7. Operation 718—incorporating the usage parameter from a source set, the source set including at least one source usage parameter, the at least one source usage parameter based at least in part on a role of a person and/or an entity—may include operation 800.

Operation 800 shows incorporating the usage parameter from the source set, the source set including the at least one source usage parameter, the at least one source usage parameter based at least in part on a role of the person and/or the entity, wherein the role is determined at least in part from an input received by a system associated with the controlling entity. Operation 800 may include, for instance, incorporating a usage parameter from a set of source usage parameters, where one or more of the source usage parameters is based in part on a role of a party 106, e.g., the usage parameter specifies a permission for the party 106 to access a medical record included in the content item because the party 106 is a doctor on the patient's medical team; and the role of the party 106 is determined at least partly by an input received by a system associated with the controlling entity 102, such as a vocal input from the controlling entity 102. The incorporating of operation 800 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

FIG. 9 depicts several alternative implementation of the high-level logic flowchart of FIG. 7. Operation 720—incorporating the usage parameter from a source set including at least one source usage parameter, the at least one source usage parameter based at least in part on an identity of a person and/or an entity—may include one or more of the following operations: 900, 902, and/or 904.

Operation 900 illustrates incorporating the usage parameter from the source set including the at least one source usage parameter, the at least one source usage parameter based at least in part on the identity of the person and/or the entity, wherein the identity of the person and/or the entity is determined at least in part from an input received by a system associated with the controlling entity. Operation 900 may include, for example, incorporating a usage parameter from a source set of usage parameters, where the usage parameter incorporated is based on a role of a party 106, e.g., the role of patent attorney drafting a patent for a specified group of inventors, and where this role is determined by the controlling entity 102 selecting the role from a list of roles in a graphical user interface operably coupled to VoIP device 104. The incorporating of operation 900 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 902 depicts incorporating the usage parameter from the source set including the at least one source usage parameter, the at least one source usage parameter based at least in part on the identity of the person and/or the entity, wherein the identity of the person and/or the entity is determined at least in part from an input received by a system associated with the controlling entity from a use of a voice recognition system to identify a voice of the person and/or the entity. Operation 902 may include, for example, incorporating a usage parameter from a source set of usage parameters, where the usage parameter incorporated is based on an identity of a party 106, e.g., the identity of a member of a legal team representing a litigant in a civil suit, and where the identity of the party 106 is determined at least in part from input from a voice recognition system which is used to verify the voice of the party 106. The incorporating of operation 902 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 904 depicts incorporating the usage parameter from the source set including the at least one source usage parameter, the at least one source usage parameter based at least in part on the identity of the person and/or the entity, wherein the identity of the person and/or the entity is determined at least in part from an input received by a system associated with the controlling entity from a use of an image recognition system to identify an image of the person and/or the entity. Operation 904 may include, for instance, incorporating a usage parameter from a source set of usage parameters, where the usage parameter incorporated is based on an identity of a party 106, e.g., and where the identity of the party 106 is determined at least in part from input from an image recognition system which is used to verify the image of the party 106. The incorporating of operation 904 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

FIG. 10 shows an alternative implementation of the high-level logic flowchart of FIG. 7. Operation 724—incorporating the usage parameter from a source set including at least one source usage parameter, the at least one source usage parameter based at least in part on an activity in which the substantially live discourse is included—may include operation 1000.

Operation 1000 shows incorporating the usage parameter from the source set including the at least one source usage parameter, the at least one source usage parameter based at least in part on the activity in which the substantially live discourse is included, wherein the activity in which the substantially live discourse is included is determined at least in part from an input received by a system associated with the controlling entity 102. Operation 1000 may include, for instance, incorporating a usage parameter from a source set of usage parameters, where the usage parameter incorporated is based on the activity of which the substantially live discourse is a part, e.g., the substantially live discourse is a deposition which is part is a criminal prosecution, and where the activity is determined at least in part from input received by a system including VoIP device 104 and associated with the controlling entity 102, the input being an entry of an activity in text form by the controlling entity 102. The incorporating of operation 1000 700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Figure 11:
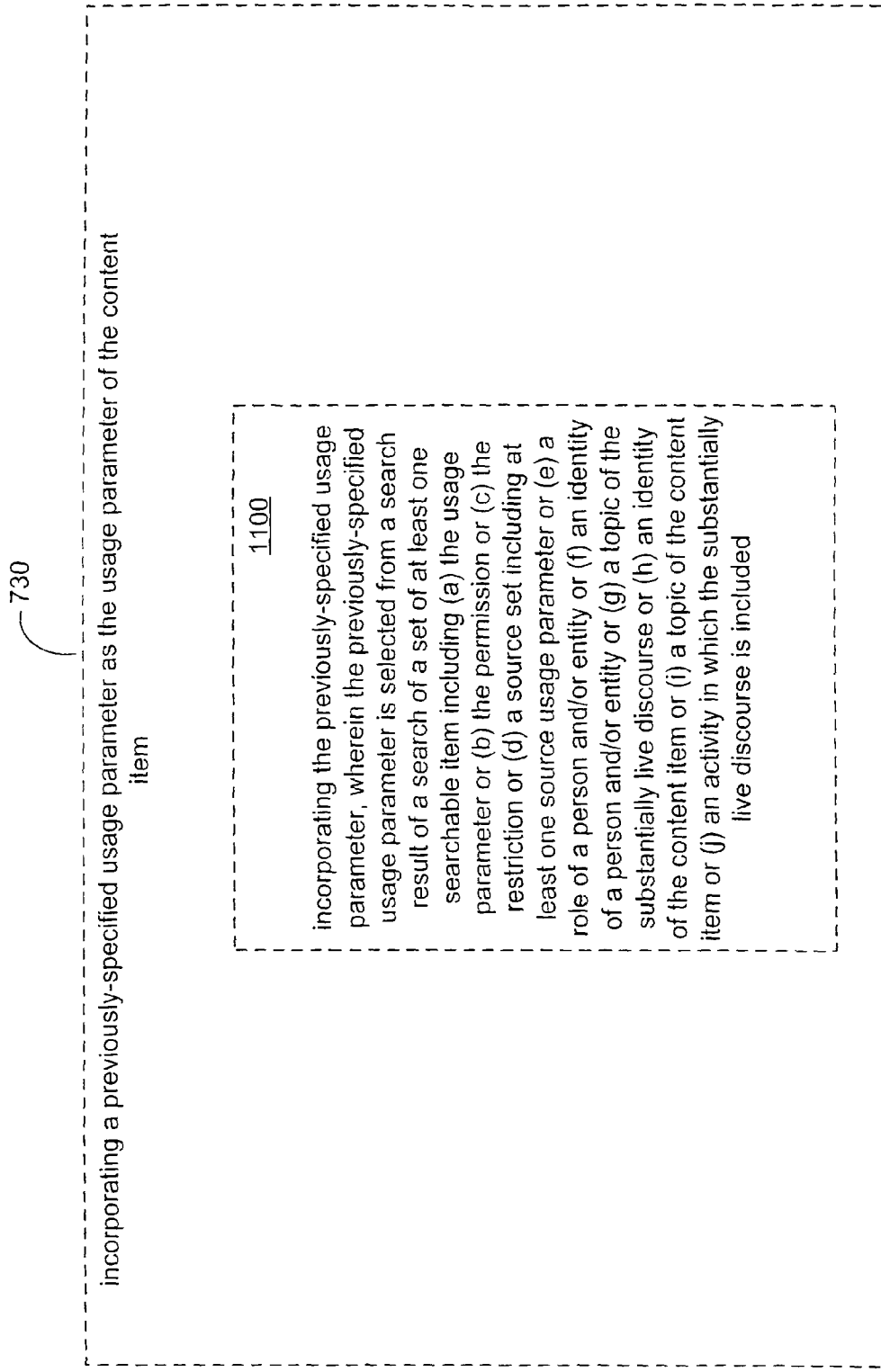
FIG. 11 shows an alternative implementation of the high-level logic flowchart of FIG. 7.

FIG. 11 shows an alternative implementation of the high-level logic flowchart of FIG. 7. Operation 730—incorporating a previously-specified usage parameter as the usage parameter of the content item—may include operation 1100.

Operation 1100 shows incorporating the previously-specified usage parameter, wherein the previously-specified usage parameter is selected from a search result of a search of a set of at least one searchable item including (a) the usage parameter or (b) the permission or (c) the restriction or (d) a source set including at least one source usage parameter or (e) a role of a person and/or entity or (f) an identity of a person and/or entity or (g) a topic of the substantially live discourse or (h) an identity of the content item or (i) a topic of the content item or (j) an activity in which the substantially live discourse is included. Operation 1100 may include, for example, incorporating a previously-associated usage parameter, where the previously-associated usage parameter is selected by the controlling entity 102 from a search result of a search of a set including usage parameters, permissions, restrictions, and activities of which the substantially live discourse might be a part. The incorporating of operation 1100 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Figure 12:
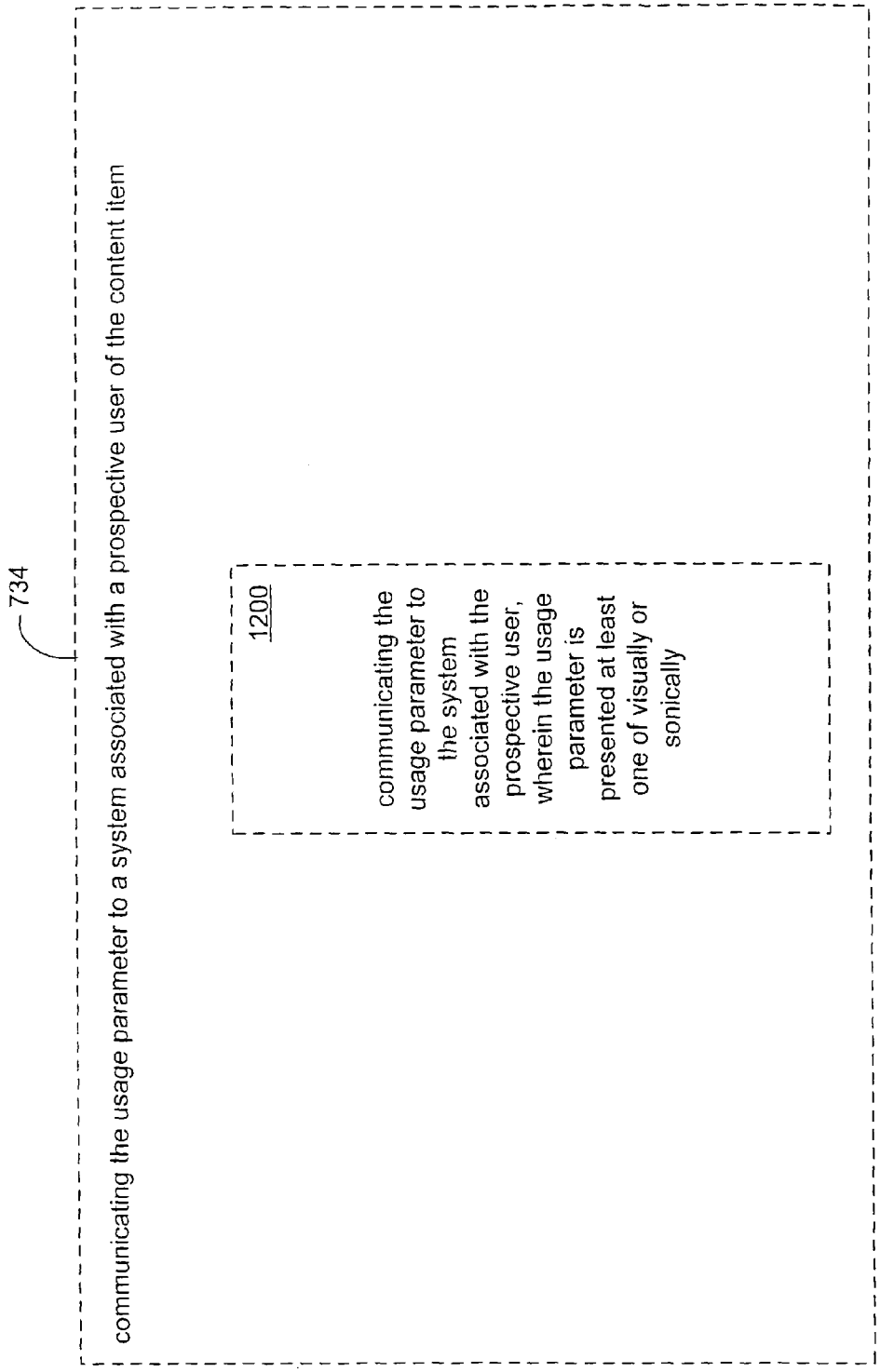
FIG. 12 shows an alternative implementation of the high-level logic flowchart of FIG. 7.

FIG. 12 shows an alternative implementation of the high-level logic flowchart of FIG. 7. Operation 734—communicating the usage parameter to a system associated with a prospective user of the content item—may include operation 1200.

Operation 1200 illustrates communicating the usage parameter to the system associated with the prospective user, wherein the usage parameter is presented at least one of visually or sonically. Operation 1200 may include, for instance, communicating a usage parameter to a prospective user of a content item with which the usage parameter is associated, to, e.g., a party 106, where the party 106 is a prospective copier of the content item, for instance, a chest x-ray, and where the usage parameter may be presented to the party 106, via a system including a VoIP device 104 and associated with the party 106, sonically, e.g., by an automated voice speaking the permissions and restrictions specified by the usage parameter, and/or visually, e.g., by a graphical user interface with a window including a list of the permissions and restrictions. The communicating of operation 1200 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Figure 13:
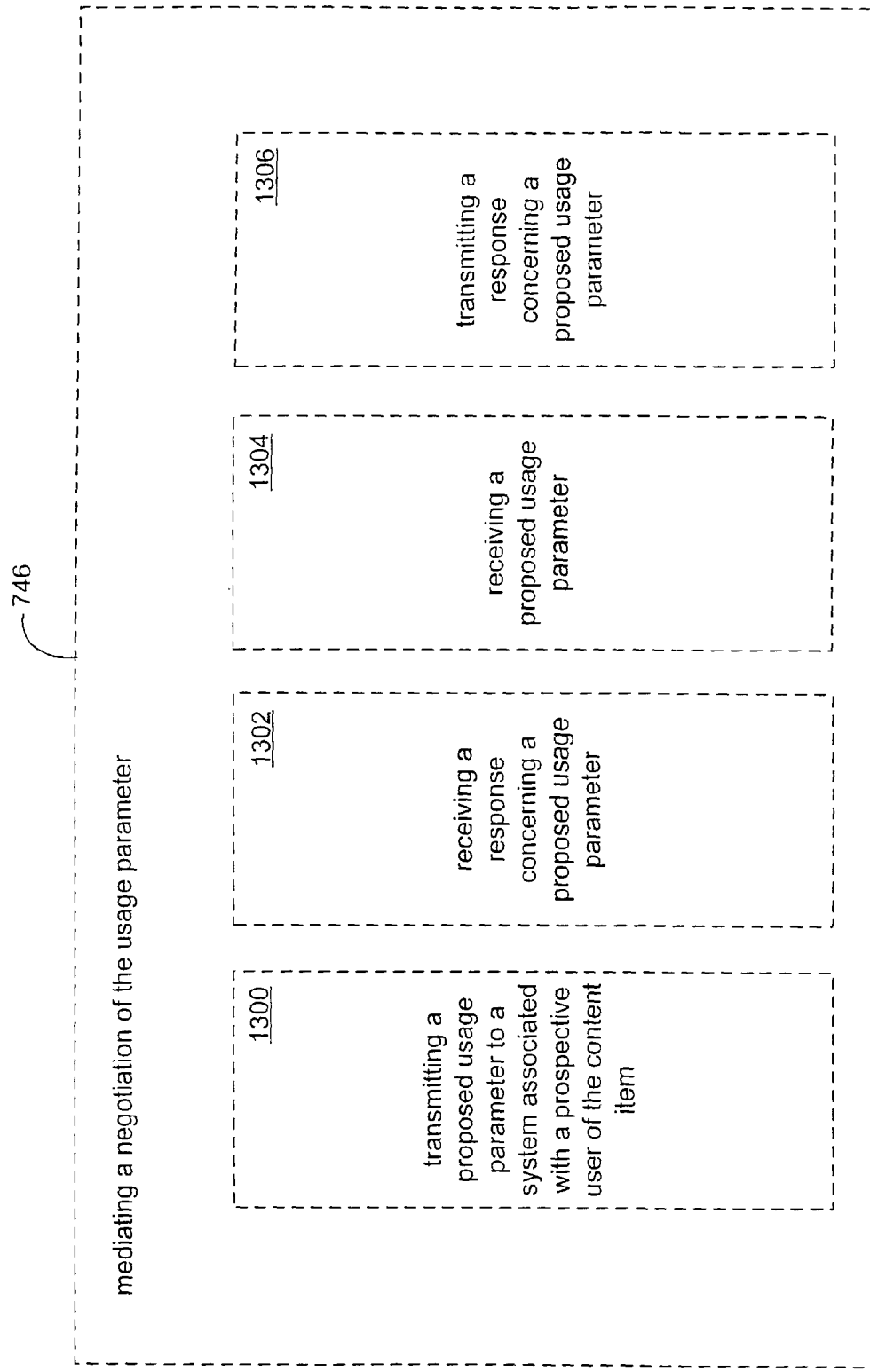
FIG. 13 illustrates several alternative implementations of the high-level logic flowchart of FIG. 7.

FIG. 13 illustrates several alternative implementations of the high-level logic flowchart of FIG. 7. Operation 746—mediating a negotiation of the usage parameter—may include one or more of the following operations: 1300, 1302, 1304, and/or 1306.

Operation 1300 depicts transmitting a proposed usage parameter to a system associated with a prospective user of the content item. Operation 1300 may include, for instance, transmitting a proposed usage parameter specifying a permission to copy and a restriction to access by three particular people from a system including a VoIP device 104 associated with the controlling entity 102 to a system including a VoIP device 104 associated with a party 106. The transmitting of operation 1300 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 1302 illustrates receiving a response concerning a proposed usage parameter. Operation 1302 may include, for instance, receiving a response with a VoIP device 104 associated with the controlling entity 102 from a system including a VoIP device 104 associated with a party 106, where the response rejects a proposal for a usage parameter by the controlling entity 102, such as the proposed usage parameter described in connection with operation 1300 and/or elsewhere herein. The receiving of operation 1302 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 1304 shows receiving a proposed usage parameter. Operation 1304 may include, for example, receiving a proposed usage parameter with a VoIP device 104 associated with the controlling entity 102 from a system including a VoIP device 104 associated with a party 106, where the proposed usage parameter specifies a permission to copy and a restriction to access by 15 particular people, e.g., the proposed usage parameter is a counter-proposal to the proposed usage parameter described in connection with operation 1300 and/or elsewhere herein. The receiving of operation 1304 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 1306 depicts transmitting a response concerning a proposed usage parameter. Operation 1306 may include, for example, transmitting an acceptance of a proposed usage parameter from a system including a VoIP device 104 associated with the controlling entity 102 to a system including a VoIP device 104 associated with a party 106, e.g., the acceptance is an acceptance of the counter-proposal described in connection with operation 1304 and/or elsewhere herein. The transmitting of operation 1306 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Figure 14:
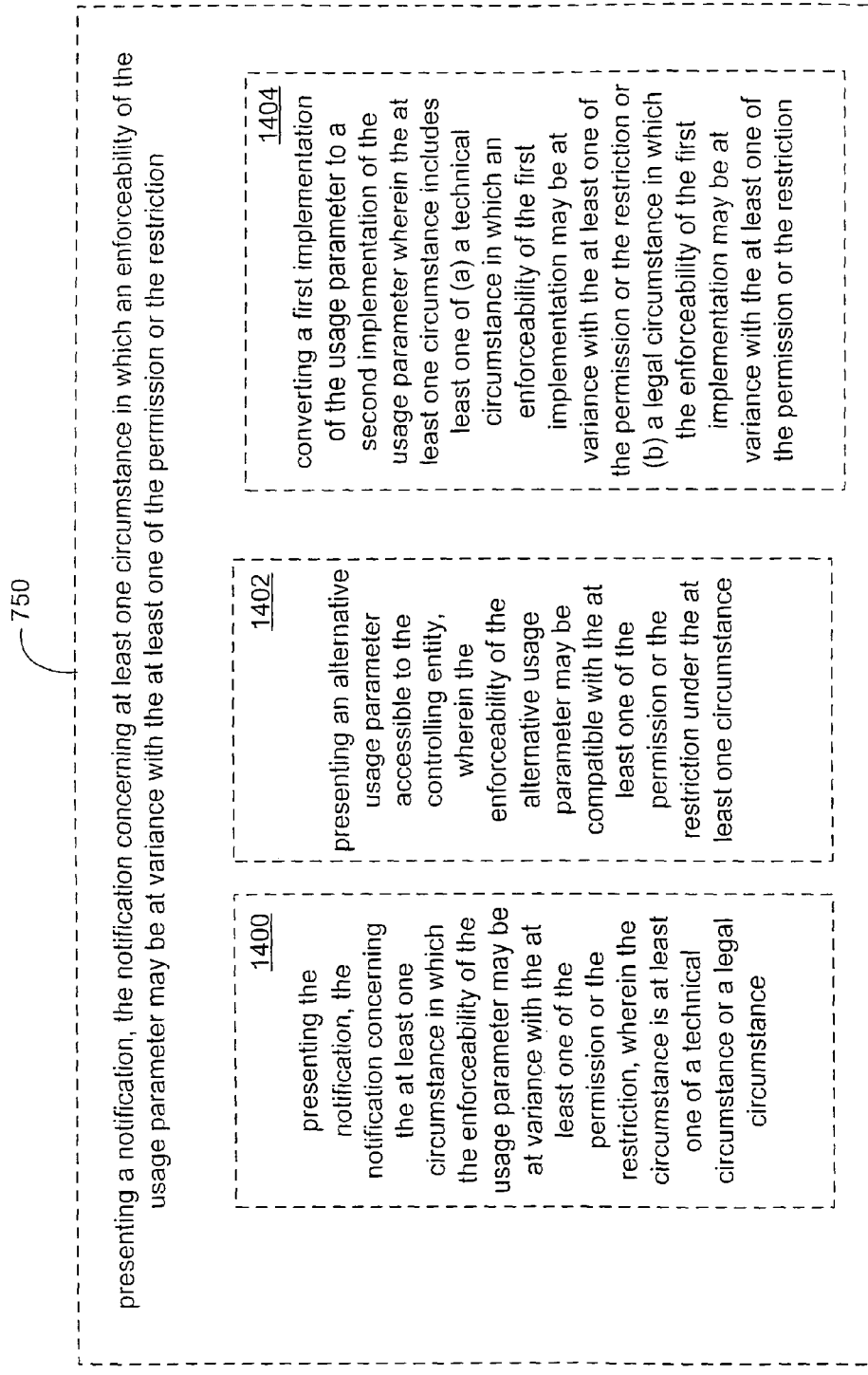
FIG. 14 depicts several alternative implementations of the high-level logic flowchart of FIG. 7.

FIG. 14 depicts several alternative implementations of the high-level logic flowchart of FIG. 7. Operation 750—presenting a notification, the notification concerning at least one circumstance in which an enforceability of the usage parameter may be at variance with the at least one of the permission or the restriction—may include one or more of the following operations: 1400, 1402, and/or 1404.

Operation 1400 shows presenting the notification, the notification concerning the at least one circumstance in which the enforceability of the usage parameter may be at variance with the at least one of the permission or the restriction, wherein the circumstance is at least one of a technical circumstance or a legal circumstance. Operation 1400 may include, for example, presenting a notification to a system associated with a controlling entity 102 and including a VoIP device 104 associated with the controlling entity 102, where the notification informs of a circumstance in which permissions and/or restrictions specified by the usage parameter may not be enforceable, e.g., a legal restriction in a foreign jurisdiction to which the content item is to be or has been sent, where the legal restriction may prevent enforcement (e.g., a legal provision prohibiting restrictions on use of copyrighted material under a fair use doctrine, where the restriction specified by the usage parameter would restrict such fair use), and/or a technical feature of a network over which the content item is to be sent, where the technical restriction may prevent enforcement (e.g., a technical feature of a network that prevents enforcement of a restriction on forwarding in accordance with the restriction specified by the usage parameter). The presenting of operation 1400 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 1402 illustrates presenting an alternative usage parameter accessible to the controlling entity, wherein the enforceability of the alternative usage parameter may be compatible with the at least one of the permission or the restriction under the at least one circumstance. Operation 1402 may include, for example, presenting an alternative usage parameter whose permissions and/or restrictions may be enforceable under a circumstance in which permissions and/or restrictions specified by the usage parameter may not be enforceable, e.g., a legal restriction in a foreign jurisdiction to which the content item is to be or has been sent, where the legal restriction may prevent enforcement (e.g., the alternative usage parameter specifies a restriction on a use of the content item that is or may be compatible with a legal provision prohibiting restrictions on use of copyrighted material under a fair use doctrine), and/or a technical feature of a network over which the content item is to be sent, where the technical restriction may prevent enforcement (e.g., the alternative usage parameter specifies a restriction on forwarding that is or may compatible with a technical feature of a network that prevents enforcement of certain restrictions on forwarding). The presenting of operation 1402 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 1404 depicts converting a first implementation of the usage parameter to a second implementation of the usage parameter wherein the at least one circumstance includes at least one of (a) a technical circumstance in which an enforceability of the first implementation may be at variance with the at least one of the permission or the restriction or (b) a legal circumstance in which the enforceability of the first implementation may be at variance with the at least one of the permission or the restriction. Operation 1404 may include, for example, converting an implementation of a usage parameter to another implementation of a usage parameter, where there are circumstances in which permissions and/or restrictions specified by the original implementation may not be enforceable, e.g., as described in connection with operation 1400 herein, and where the other implementation is or may be enforceable, e.g., as described herein in connection with the alternative usage parameter of operation 1402. The converting of operation 1404 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Figure 15:
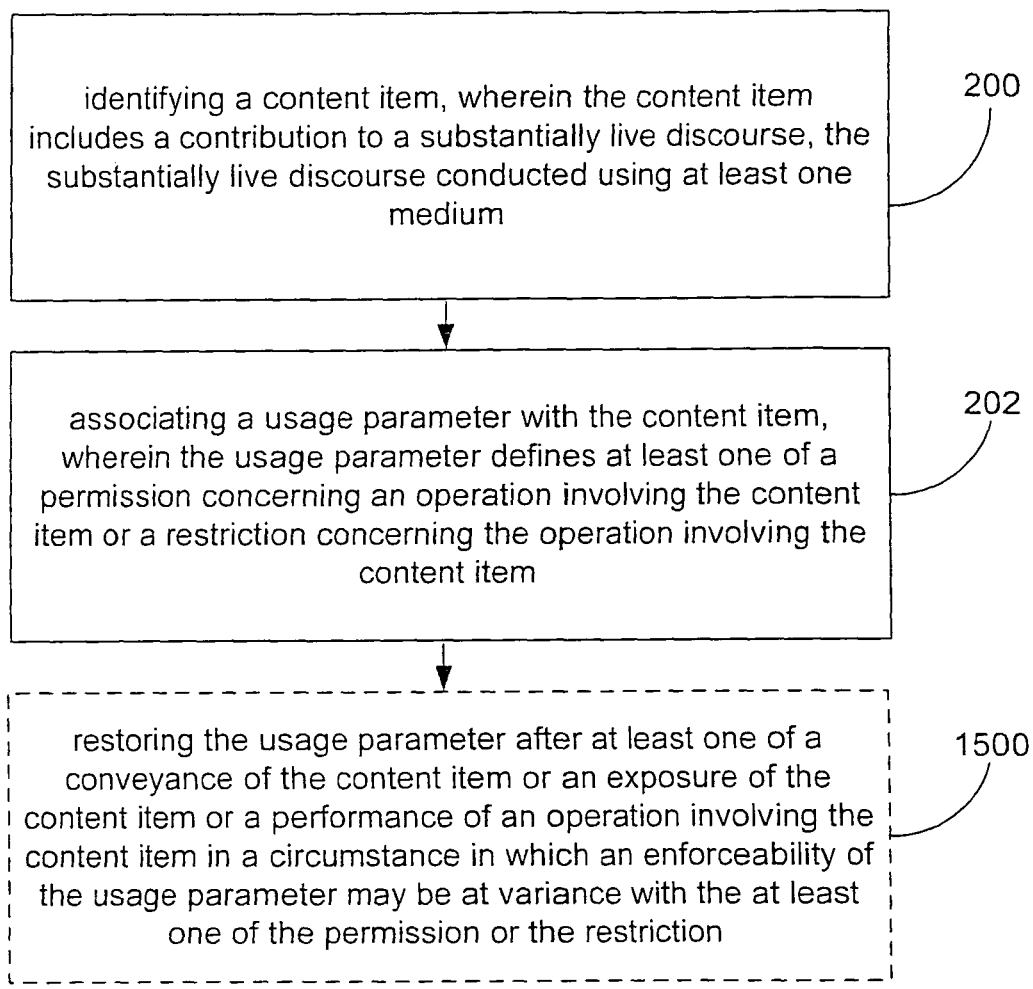
FIG. 15 depicts a high-level logic flowchart of an operational process.

FIG. 15 depicts a high-level logic flowchart of an operational process. The depicted process may include one or more of the following operations: 200 (described elsewhere herein), 202 (described elsewhere herein), and/or 1500.

Operation 1500 shows restoring the usage parameter after at least one of a conveyance of the content item or an exposure of the content item or a performance of an operation involving the content item in a circumstance in which an enforceability of the usage parameter may be at variance with the at least one of the permission or the restriction. Operation 1500 may include, for instance, restoring a usage parameter where the content item with which it is associated has been conveyed and/or exposed and/or used in a circumstance in which permissions and/or restrictions specified by the usage parameter may have been or were not enforced, such as associating the usage parameter with the content item again, after sending the content item across a network with a technical feature incompatible with enforcement, or into, across, or through a location such as a jurisdiction with a legal provision incompatible with enforcement. The restoring of operation 1500 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Figure 16:
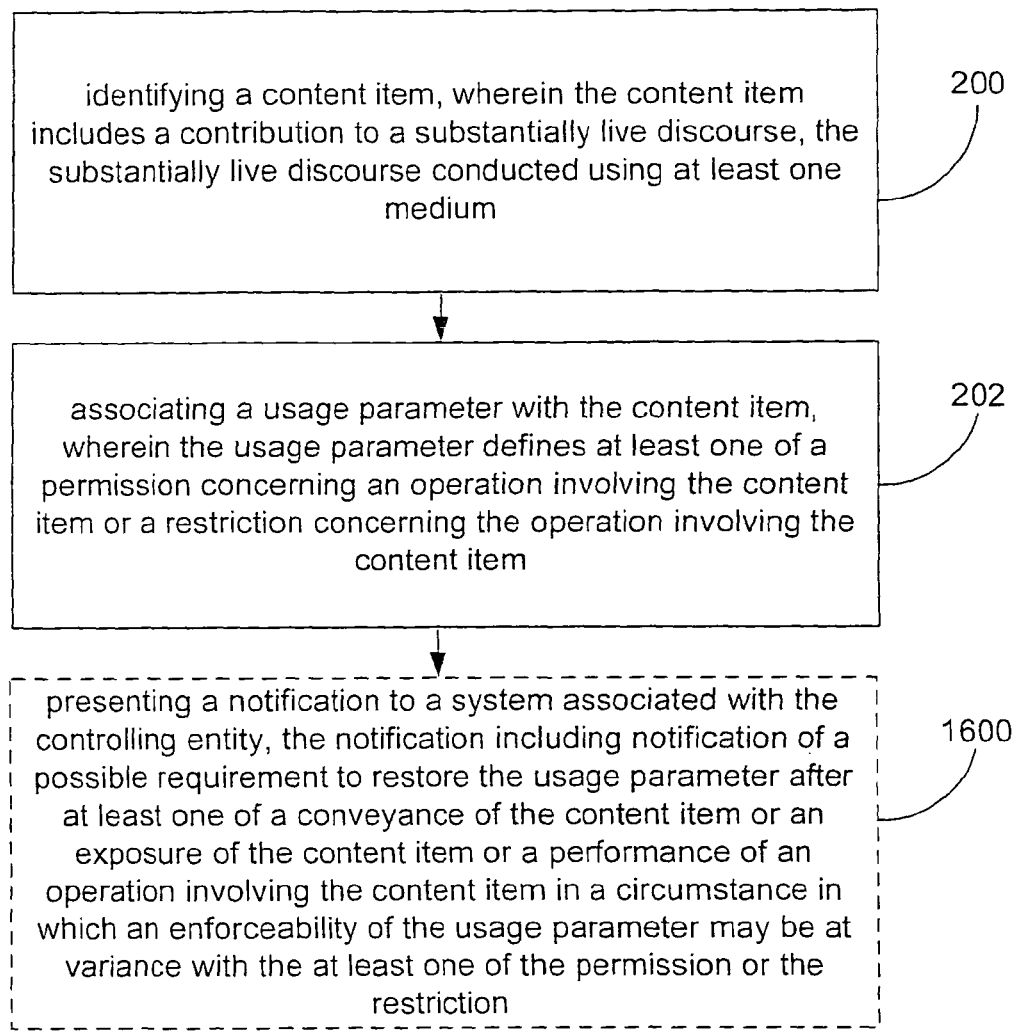
FIG. 16 depicts a high-level logic flowchart of an operational process.

FIG. 16 depicts a high-level logic flowchart of an operational process. The depicted process may include one or more of the following operations: 200 (described elsewhere herein), 202 (described elsewhere herein), and/or 1600.

Operation 1600 illustrates presenting a notification to a system associated with the controlling entity, the notification including notification of a possible requirement to restore the usage parameter after at least one of a conveyance of the content item or an exposure of the content item or a performance of an operation involving the content item in a circumstance in which an enforceability of the usage parameter may be at variance with the at least one of the permission or the restriction. Operation 1600 may include, for example, presenting a notification to a system including a VoIP device 104 associated with a controlling entity 102 that a content item with which it is associated has been conveyed and/or exposed and/or used in a circumstance in which permissions and/or restrictions specified by the usage parameter may have been or were not enforced, where the notification addresses the possible requirement to restore the usage parameter originally associated with the content item. The presenting of operation 1600 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Figure 17:
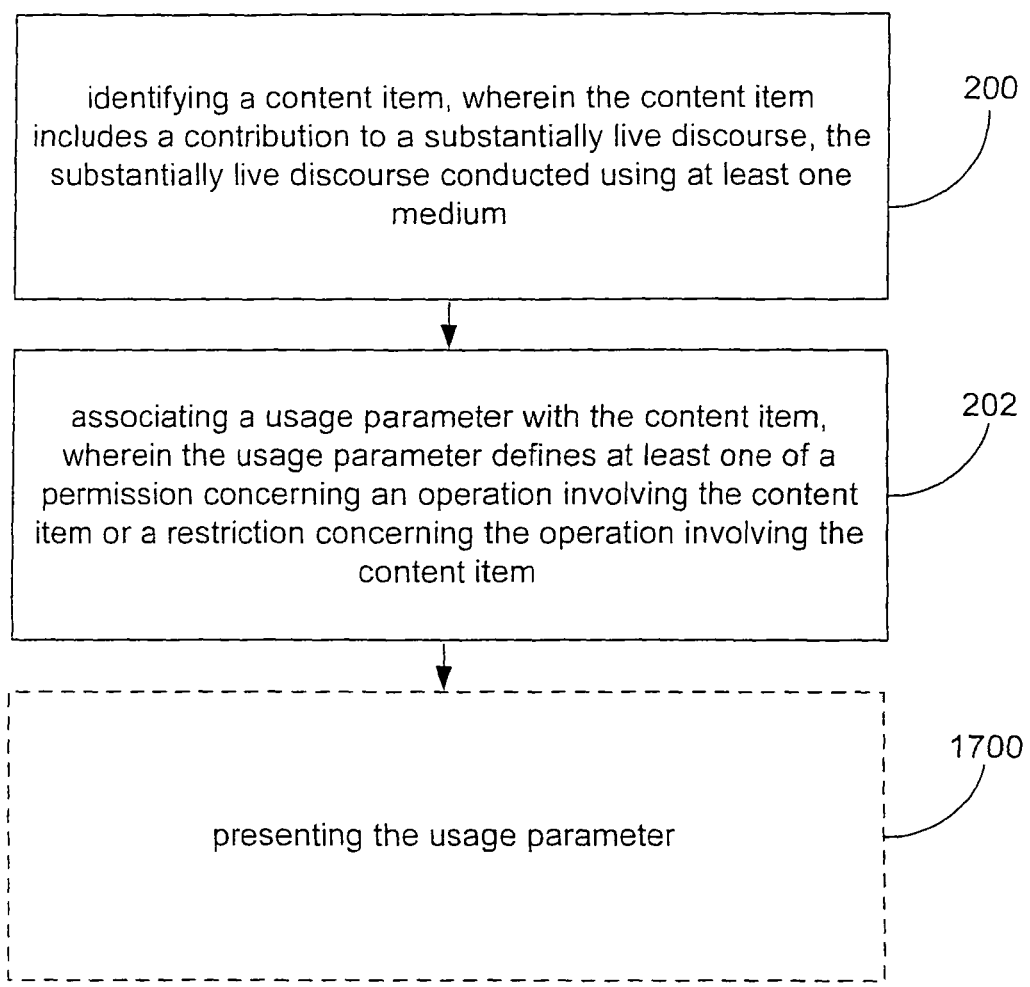
FIG. 17 shows a high-level logic flowchart of an operational process.

FIG. 17 shows a high-level logic flowchart of an operational process. The depicted process may include one or more of the following operations: 200 (described elsewhere herein), 202 (described elsewhere herein), and/or 1700.

Operation 1700 shows presenting the usage parameter. Operation 1700 may include, for example, presenting a usage parameter to, e.g., a system including a VoIP device 104 associated with a controlling entity 102, and/or a system including an IM device 118 associated with a party 106, so that he or she may be informed of the permissions and/or restrictions specified by the usage parameter. The presenting of operation 1700 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Figure 18:
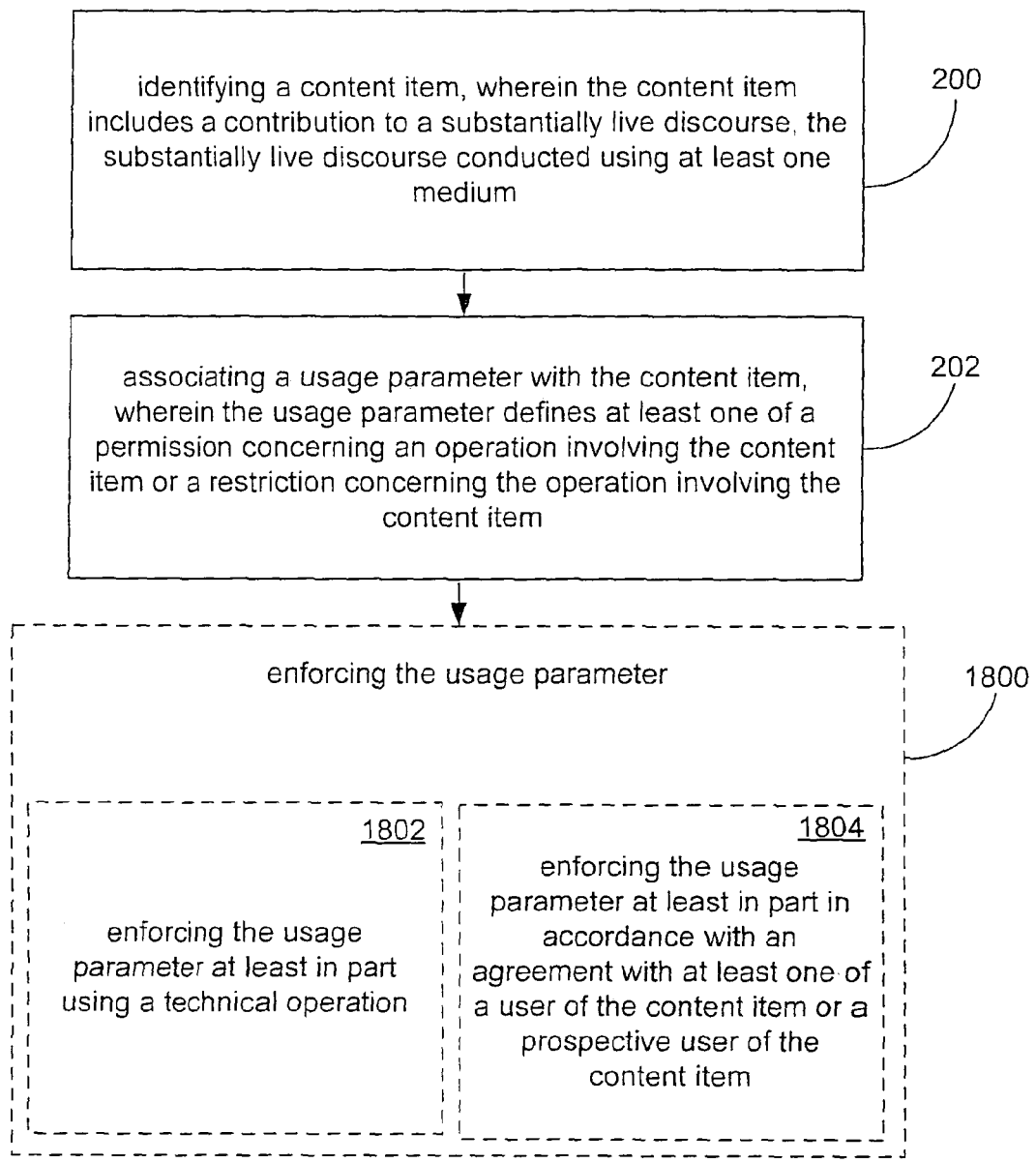
FIG. 18 depicts a high-level logic flowchart of an operational process.

FIG. 18 depicts a high-level logic flowchart of an operational process. The depicted process may include one or more of the following operations: 200 (described elsewhere herein), 202 (described elsewhere herein), and/or 1800. Operation 1800 may include one or more of the following operations: 1802 and/or 1804.

Operation 1800 illustrates enforcing the usage parameter. Operation 1800 may include, for instance, performing an act and/or an operation to prevent a restriction specified by a usage parameter from being violated, and/or performing an act and/or an operation to enable an operation that is the subject of a permission specified by a usage parameter to be performed. The enforcing of operation 1800 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 1802 depicts enforcing the usage parameter at least in part using a technical operation. Operation 1802 may include, for example, performing a technical operation to prevent a restriction specified by a usage parameter from being violated, and/or performing a technical operation to enable an operation that is the subject of a permission specified by a usage parameter to be performed, e.g., performing an operation with hardware/software/firmware to prevent a party 106 from making more than the seven copies of a content item allowed by the permissions and/or restrictions. The enforcing of operation 1802 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 1804 illustrates enforcing the usage parameter at least in part in accordance with an agreement with at least one of a user of the content item or a prospective user of the content item. Operation 1804 may include, for instance, obtaining the agreement of a user or prospective user of the content item such as party 106 to abide by the permissions and/or restrictions specified by the usage parameter. The enforcing of operation 1804 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Figure 19:
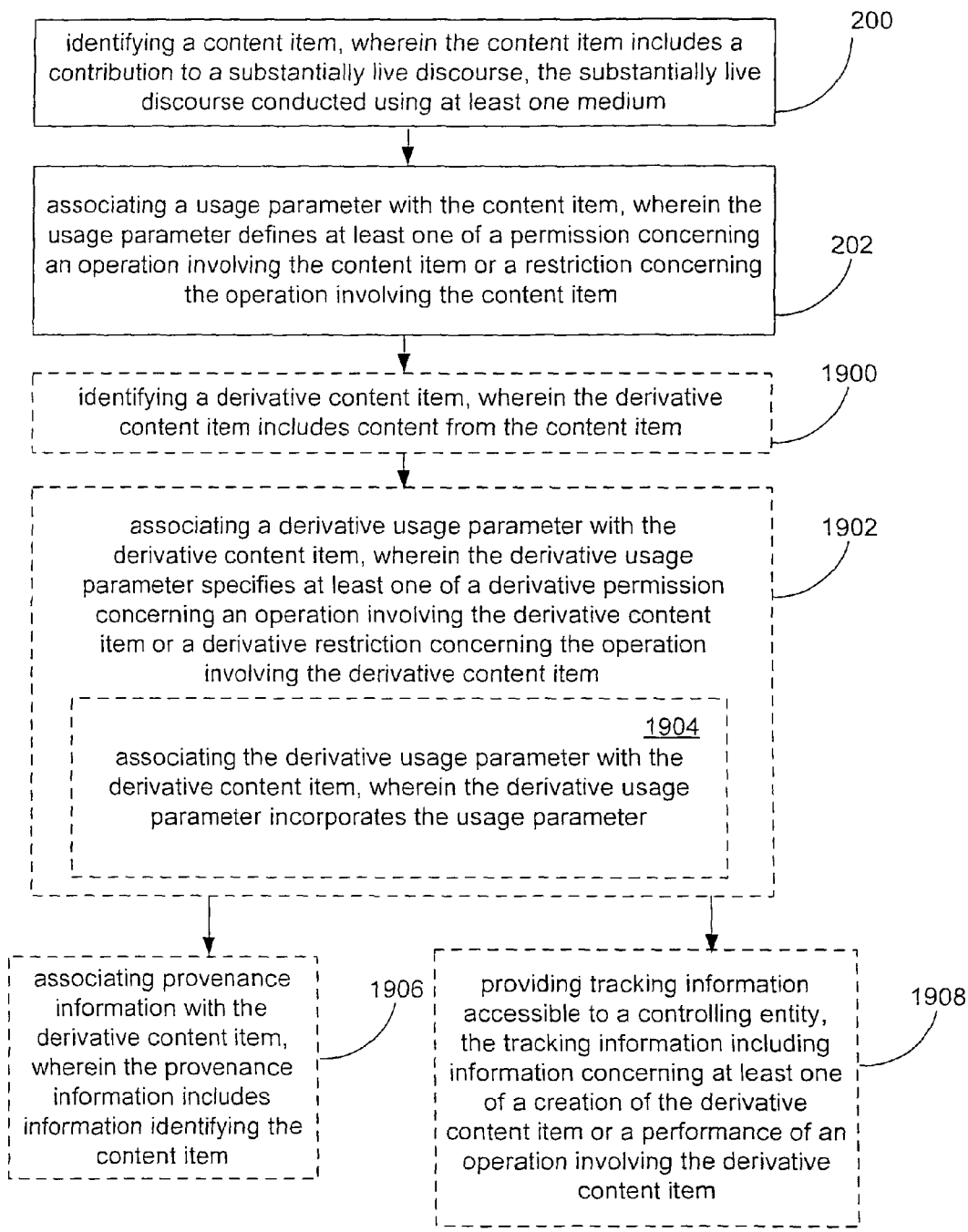
FIG. 19 shows a high-level logic flowchart of an operational process.

FIG. 19 shows a high-level logic flowchart of an operational process. The depicted process may include one or more of the following operations: 200 (described elsewhere herein), 202 (described elsewhere herein), 1900, 1902, 1904, 1906, and/or 1908.

Operation 1900 shows identifying a derivative content item, wherein the derivative content item includes content from the content item. Operation 1900 may include, for instance, identifying a derivative content item that includes content taken from, directly and/or indirectly from a content item, such as a summary or a collection of out-takes. The identifying of operation 1900 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 1902 illustrates associating a derivative usage parameter with the derivative content item, wherein the derivative usage parameter specifies at least one of a derivative permission concerning an operation involving the derivative content item or a derivative restriction concerning the operation involving the derivative content item. Operation 1902 may include, for instance, associating a derivative usage parameter with a derivative content item as identified in operation 1900, where the associating may be performed by a person and/or entity such as a controlling entity 102 using a VoIP device 104 and/or a secondary device 112. Such a derivative usage parameter may, for instance, specify a permission that a controlling entity 102 grants to a party 106 to perform an operation involving a derivative content item, such as permission to retain the derivative content item for a specified period of time. A usage parameter may also specify a restriction that a controlling entity 102 places on a party 106 to enjoin performance of an operation involving a derivative content item, such as restriction enjoining copying and/or distribution of the derivative content item. The associating of operation 1902 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 1902 may include operation 1904. Operation 1904 shows associating the derivative usage parameter with the derivative content item, wherein the derivative usage parameter incorporates the usage parameter. A derivative usage parameter may, for instance specify a permission that a controlling entity 102 grants to a party 106 to perform an operation involving a derivative content item, such as permission to retain the derivative content item for a specified period of time. A derivative content item may include a derivative work derived from a content item, such as, e.g., a copyrighted work. The associating of operation 1904 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 1906 depicts associating provenance information with the derivative content item, wherein the provenance information includes information identifying the content item. Operation 1906 may involve, for example, associating provenance information such as the identity and/or location and/or role of the creator of the derivative content item, e.g., a party 106, as well as the content item from which content was drawn to create the derivative content item. The associating of operation 1906 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 1908 shows providing tracking information accessible to a controlling entity, the tracking information including information concerning at least one of a creation of the derivative content item or a performance of an operation involving the derivative content item. Operation 1908 may involve, for instance, providing tracking information to a system including a VoIP device 104 and associated with a controlling entity 102, where the tracking information includes information about the creation of a derivative content item, e.g., a notification of the creation and/or information identifying the creator, and/or information about a copying and/or an accessing and/or a forwarding of the derivative content item. The providing of operation 1906 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

FIG. 20 illustrates a high-level logic flowchart of an operational process. The depicted process may include one or more of the following operations: 200 (described elsewhere herein), 202 (described elsewhere herein), 2000 and/or 2002.

Operation 2000 depicts transmitting a proposal including a prospective usage parameter for association with at least one of a response to the content item or a derivative content item including content from the content. Operation 2000 may include, for example, transmitting a proposal where the proposal includes a prospective usage parameter for association with at least one of a response to the content item and/or a derivative content item including content from the content item, so as to propose permissions and/or restrictions for the response and/or the derivative content item before they are created, for example, a proposed usage parameter from controlling entity 102's VoIP device 104 to limit a receiving party 106's VoIP device 104's actions (e.g., such as copying and/or summarizing) with respect to a text and/or auditory file containing a speech to be subsequently utilized upon agreement with respect to the proposed usage parameter. The transmitting of operation 2000 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Operation 2002 illustrates mediating a negotiation of the prospective usage parameter. Operation 2002 may include, for example, mediating a negotiation between recipient of a respective usage parameter, such as a party 106, and a source of the prospective usage parameter, e.g., a controlling entity 102, by communicating and/or receiving proposed prospective usage parameters, and/or communicating and/or receiving responses to such proposals. The mediating of operation 2002 may be performed, for example, by a VoIP device 104 and/or an IM device 118 and/or a secondary device 112 and/or hardware/software/firmware operably coupled to those devices, and/or one or more channels 108 and/or one or more secondary channels 114 and/or hardware/software/firmware operably coupled to those channels.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementery determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (Asics), Field Programmable Gate Arrays (Fogs), digital signal processors (Dips), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein, electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together and/or A, B, and C together, etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system related to data management, the system comprising:
    circuitry for identifying a textual content item, wherein the textual content item includes at least one of a contribution or an additional contribution to a substantially live text messaging discourse between multiple parties, the substantially live discourse conducted: a) using at least one medium b) by one of the multiple parties making at least one of the contribution or the additional contribution to the substantially live discourse to another of the multiple parties, and c) by one of the multiple parties receiving at least one of the contribution or the additional contribution to the substantially live discourse from another of the multiple parties;
    circuitry for associating a usage parameter with the textual content item, wherein the usage parameter specifies at least one of a permission concerning an operation involving the textual content item or a restriction concerning the operation involving the textual content item; and
    circuitry for transferring the usage parameter associated with the textual content item from a controlling entity to the one or more of the multiple parties to enable the one or more of the multiple parties to control at least one of the permission concerning the operation involving the textual content item or the restriction concerning the operation involving the textual content item.

2. A system related to data management, the system comprising:
    a processor;
    a memory coupled to the processor;
    logic operable with the processor for identifying a content item, wherein the content item includes at least one of a contribution or an additional contribution that is a component of a substantially live multi-directional discourse conducted at least in part via a communications network, the substantially live multi-directional discourse conducted: a) between multiple parties using at least one medium, b) by one of the multiple parties making at least one of the contribution or the additional contribution to the substantially live discourse to another of the multiple parties, and c) by one of the multiple parties receiving at least one of the contribution or the additional contribution to the substantially live discourse from another of the multiple parties;
    logic operable with the processor for associating a usage parameter with the content item that is a component of the substantially live multi-directional discourse, wherein the associated usage parameter specifies at least one of a permission concerning an operation involving the content item or a restriction concerning the operation involving the content item; and
    logic operable with the processor to communicate the usage parameter associated with the content item from a controlling entity to the multiple parties to enable one or more of the multiple parties to control at least one of the permission concerning the operation involving the content item or the restriction concerning the operation involving the content item.

3. A program product related to data management, the program product comprising:
    a non-transitory signal bearing medium including one or more instruction that when executed by one or more processors perform the method comprising:
    identifying a content item, wherein the content item includes at least one of a contribution or an additional contribution included as a component of a substantially live discourse, the substantially live discourse conducted:
        a) between multiple parties using at least one medium,
        b) by one of the multiple parties making at least one of the contribution or the additional contribution to the substantially live discourse to another of the multiple parties, and
        c) by one of the multiple parties receiving at least one of the contribution or the additional contribution to the substantially live discourse from another of the multiple parties;

associating a usage parameter with the content item included as the component of the substantially live discourse, wherein the usage parameter specifies at least one of a permission concerning an operation involving the content item or a restriction concerning the operation involving the content item; and communicating the usage parameter associated with the content item from a controlling entity of the content item to one or more of the multiple parties to enable the one or more of the multiple parties to control at least one of the permission concerning the operation involving the content item or the restriction concerning the operation involving the content item.

4. The program product of claim 3, wherein the method comprising identifying a content item, wherein the content item includes at least one of a contribution or an additional contribution included as a component of the substantially live discourse, the substantially live discourse conducted between the multiple parties using at least one medium, further includes:

identifying the content item using input associated with the controlling entity of the content item.

5. The program product of claim 3, wherein the method comprising identifying a content item, wherein the content item includes at least one of a contribution or an additional contribution included as a component of the substantially live discourse, the substantially live discourse conducted between multiple parties using at least one medium, further includes:

identifying the content item, wherein the content item includes at least one of the contribution or an additional contribution included as a component of the substantially live discourse, and wherein the component includes at least one of a speech or an image file or an audio file or an audio data stream or a video file or a video data stream.

6. The program product of claim 3, wherein the method comprising identifying a content item, wherein the content item includes at least one of a contribution or an additional contribution included as a component of the substantially live discourse, the substantially live discourse conducted using at least one medium, further includes:

identifying the content item, wherein the content item includes at least one of the contribution or an additional contribution included as a component of the substantially live discourse, and wherein at least one of the contribution or an additional contribution also includes a supporting item of the substantially live discourse, the supporting item including at least one of a speech or an electronic mail or an instant messaging text or an image file or an audio file or an audio data stream or a video file or a video data stream.

7. The program product of claim 3, wherein the method comprising identifying a content item, wherein the content item includes at least one of a contribution or an additional contribution included as a component of the substantially live discourse, the substantially live discourse conducted using at least one medium, further includes:

identifying the content item, wherein the content item includes at least two non-contiguous temporal segments of a speech, an image file, an audio file, an audio data stream, a video file or a video data stream.

8. The program product of claim 3, wherein the method comprising identifying a content item, wherein the content item includes a contribution or an additional contribution included as a component of the substantially live discourse, the substantially live discourse conducted between multiple parties using at least one medium, further includes:

identifying the content item, wherein the substantially live discourse is conducted at least in part using Voice over Internet Protocol.

9. The program product of claim 3, wherein the method comprising identifying a content item, wherein the content item includes at least one of a contribution or an additional contribution included as a component of the substantially live discourse, the substantially live discourse conducted using at least one medium, further includes:

one or more instructions for identifying the content item, wherein the substantially live discourse is conducted at least in part using instant messaging.

10. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:

associating the usage parameter with the content item included as the component of the substantially live discourse, wherein the at least one of the permission or the restriction specified in the communicated usage parameter includes at least one of a permission concerning a copying of the content item or a restriction concerning the copying of the content item.

11. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further comprise:

one or more instructions for associating the usage parameter with the content item included as the component of the substantially live discourse, wherein the at least one of the permission or the restriction includes at least one of a permission concerning an accessing of the content item or a restriction concerning the accessing of the content item.

12. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further comprise:

associating the usage parameter with the content item included as the component of the substantially live discourse, wherein the at least one of the permission or the restriction includes at least one of a permission concerning an altering of the content item or a restriction concerning the altering of the content item.

13. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further comprise:

associating the usage parameter with the content item included as the component of the substantially live discourse, wherein the at least one of the permission or the restriction includes at least one of a permission concerning a forwarding of the content item or a restriction concerning the forwarding of the content item to enable the one or more of the multiple parties to examine the usage parameter to control at least one of the permission concerning the operation involving the content item or the restriction concerning the operation involving the content item.

14. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
associating the usage parameter with the content item included as the component of the substantially live discourse, wherein the at least one of the permission or the restriction includes at least one of a permission concerning a retaining a portion of the content item for a predetermined time period, or a restriction concerning the retaining a portion of the content item for a predetermined time period.

15. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
communicating the usage parameter associated with the content item to the one or more parties, wherein the at least one of the permission or the restriction indicated in the usage parameter includes at least one of a permission concerning a creating a derivative content item from the content item or a restriction concerning the creating the derivative content item from the content item to enable the one or more of the multiple parties to control operations involving the content item at least one of the permissions.

16. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
associating the usage parameter with the content item, wherein the at least one of the permission or the restriction specified by the usage parameter is conditioned in response to at least one of:
a length of a time period, an occurrence of an event, or a location of a system.

17. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
incorporating the usage parameter from a source set, the source set including at least one source usage parameter, the at least one source usage parameter based at least in part on a role of a person and/or an entity.

18. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
incorporating the usage parameter from a source set including at least one source usage parameter, the at least one source usage parameter based at least in part on an identity of a person and/or an entity.

19. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
incorporating the usage parameter in one or more of the multiple parties, the usage parameter being from a source set including at least one source usage parameter, the at least one source usage parameter based at least in part on an identity of a system from which the content item originates.

20. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
incorporating the usage parameter from a source set including at least one source usage parameter, the at least one source usage parameter based at least in part on an activity in which the substantially live discourse is included.

21. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
associating the communicated usage parameter with the content item, wherein the content item included as the component of the substantially live discourse is searchable according to the communicated usage parameter associated with the content item.

22. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
incorporating a previously-specified usage parameter as the usage parameter of the content item.

23. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
incorporating the usage parameter, wherein the usage parameter replaces a previously-associated usage parameter, the previously-associated usage parameter being previously associated with the content item.

24. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
communicating the usage parameter to a system associated with a prospective user of the content item.

25. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
detecting a conflict in distribution rights specified in the usage parameter and distribution rights specified in a prestored usage parameter associated with a content item.

26. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
presenting a notification accessible by the controlling entity, the notification concerning a conflict between the usage parameter and a conflicting usage parameter associated with a content item.

27. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
mediating a negotiation of the usage parameter.

28. The program product of claim 27, wherein the method comprising mediating a negotiation of the usage parameter further includes:
transmitting a proposed usage parameter from the controlling entity to a system associated with a prospective user of the content item.

29. The program product of claim 27, wherein the method comprising mediating a negotiation of the usage parameter further includes:
receiving a response concerning a proposed usage parameter.

30. The program product of claim 27, wherein the method comprising mediating a negotiation of the usage parameter further includes:
receiving a proposed usage parameter.

31. The program product of claim 27, wherein the method comprising mediating a negotiation of the usage parameter further includes:
transmitting a response concerning a proposed usage parameter.

32. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
providing data required for an enforceability of the usage parameter.

33. The program product of claim 3, wherein the method comprising associating a usage parameter with the content item included as the component of the substantially live discourse, wherein the usage parameter specifies at least one of a permission concerning an operation involving the content item or a restriction concerning the operation involving the content item, further includes:
presenting a notification, the notification concerning at least one circumstance having a probability that an enforceability of the usage parameter is at variance with the at least one of the permission or the restriction.

34. The program product of claim 33, wherein the method comprising presenting a notification, the notification concerning at least one circumstance having a probability that an enforceability of the usage parameter is at variance with the at least one of the permission or the restriction, further includes:
presenting the notification, the notification concerning the at least one circumstance having the probability that the enforceability of the usage parameter is at variance with the at least one of the permission or the restriction, wherein the circumstance is a technical circumstance.

35. The program product of claim 33, wherein the method comprising presenting a notification, the notification concerning at least one circumstance having a probability that an enforceability of the usage parameter is at variance with the at least one of the permission or the restriction, further includes:
presenting an alternative usage parameter accessible to the controlling entity, wherein an enforceability of the alternative usage parameter is likely compatible with the at least one of the permission or the restriction under the at least one circumstance.

36. The program product of claim 33, wherein the method comprising presenting a notification, the notification concerning at least one circumstance having a probability that an enforceability of the usage parameter is at variance with the at least one of the permission or the restriction, further includes:
converting a first implementation of the usage parameter to a second implementation of the usage parameter wherein the at least one circumstance includes at least one of (a) a technical circumstance having a probability that an enforceability of the first implementation is at variance with the at least one of the permission or the restriction or (b) a legal circumstance having a probability that the enforceability of the first implementation is at variance with the at least one of the permission or the restriction.

37. The program product of claim 3, wherein the method further includes:
restoring the usage parameter after at least one of a conveyance of the content item or an exposure of the content item or a performance of an operation involving the content item in a circumstance having a probability that an enforceability of the usage parameter is at variance with the at least one of the permission or the restriction.

38. The program product of claim 3, wherein the method further includes:
presenting a notification to a system associated with the controlling entity, the notification including notification of a possible requirement to restore the usage parameter after at least one of a conveyance of the content item or an exposure of the content item or a performance of an operation involving the content item in a circumstance having a probability that an enforceability of the usage parameter is at variance with the at least one of the permission or the restriction.

39. The program product of claim 3, wherein the method further includes:
presenting the usage parameter from the controlling entity to one or more of the multiple parties.

40. The program product of claim 3, wherein the method further includes enforcing the usage parameter.

41. The program product of claim 40, wherein the method comprising enforcing the usage parameter further includes:
enabling the one or more of the multiple parties to enforce the information in the communicated usage parameter at least in part using a technical operation.

42. The program product of claim 40, wherein the method comprising enforcing the usage parameter further includes:
enforcing the usage parameter at least in part in accordance with an agreement with at least one of a user of the content item or a prospective user of the content item.

43. The program product of claim 3, wherein the method further includes:
identifying a derivative content item, wherein the derivative content item includes content from the content item; and
associating a derivative usage parameter with the derivative content item, wherein the derivative usage parameter specifies at least one of a derivative permission concerning an operation involving the derivative content item or a derivative restriction concerning the operation involving the derivative content item.

44. The program product of claim 3, wherein the method further includes:
transmitting a proposal including a prospective usage parameter for association with at least one of a response to the content item or a derivative content item; and
mediating a negotiation of the prospective usage parameter.

45. The program product of claim 3, wherein the controlling entity is the one of the multiple parties making at least one of the contribution or the additional contribution to the substantially live discourse.

46. The program product of claim 3, wherein the non-transitory signal bearing medium including one or more instruction that when executed by the one or more processors perform the method further comprises:
communicating the usage parameter associated with a content item included in at least one of the contribution or the additional contribution from another of the multiple parties to enable at least one of the multiple parties to control at least one of the permission concerning the operation involving the content item or the restriction concerning the operation involving the content item.

* * * * *